(12) United States Patent
Hwang et al.

(10) Patent No.: US 9,916,431 B2
(45) Date of Patent: Mar. 13, 2018

(54) CONTEXT-BASED ACCESS VERIFICATION

(71) Applicant: QUALCOMM Incorporated, San Diego, CA (US)

(72) Inventors: Kyu Woong Hwang, Daejeon (KR); Seungwoo Yoo, Sungnam (KR); Duck-Hoon Kim, Seoul (KR); Sungwoong Kim, Seoul (KR); Te-Won Lee, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 14/597,905

(22) Filed: Jan. 15, 2015

(65) Prior Publication Data

US 2016/0210451 A1    Jul. 21, 2016

(51) Int. Cl.
*G06F 21/32* (2013.01)
*G06F 21/31* (2013.01)
*G06K 9/00* (2006.01)
*G10L 17/24* (2013.01)
*H04L 29/06* (2006.01)

(52) U.S. Cl.
CPC ........... *G06F 21/32* (2013.01); *G06F 21/316* (2013.01); *G06K 9/00087* (2013.01); *G06K 9/00288* (2013.01); *G06K 9/00617* (2013.01); *G10L 17/24* (2013.01); *H04L 63/0861* (2013.01); *H04L 63/10* (2013.01)

(58) Field of Classification Search
CPC ................ G06F 21/31; G06F 21/6218; G06F 2221/2141; G06F 2221/2113; G06F 21/10; G06F 21/32
See application file for complete search history.

(56) References Cited

U.S. PATENT DOCUMENTS 8,090,945 B2 * 1/2012 Singhal .................. G06F 21/32
                                                    713/168
8,302,152 B1 10/2012 Hewinson
(Continued)

FOREIGN PATENT DOCUMENTS

EP       2743873 A1 * 6/2014 ....... G06Q 20/40145

OTHER PUBLICATIONS

International Search Report and Written Opinion for International Application No. PCT/US2015/065986, ISA/EPO, dated Mar. 22, 2016, 12 pages.

*Primary Examiner* — Farid Homayounmehr
*Assistant Examiner* — Sanchit Sarker
(74) *Attorney, Agent, or Firm* — Toler Law Group

(57) ABSTRACT

A method, performed by an electronic device, for verifying a user to allow access to the electronic device is disclosed. In this method, sensor data may be received from a plurality of sensors including at least an image sensor and a sound sensor. Context information of the electronic device may be determined based on the sensor data and at least one verification unit may be selected from a plurality of verification units based on the context information. Based on the sensor data from at least one of the image sensor or the sound sensor, the at least one selected verification unit may calculate at least one verification value. The method may determine whether to allow the user to access the electronic device based on the at least one verification value and the context information.

30 Claims, 12 Drawing Sheets

(56) References Cited

U.S. PATENT DOCUMENTS

| | | | | |
|---|---|---|---|---|
| 8,646,060 B1* | 2/2014 | Ben Ayed | ........... | H04L 63/0853 726/9 |
| 2003/0028784 A1* | 2/2003 | Uchida | .............. | G06K 9/00026 713/186 |
| 2005/0223236 A1* | 10/2005 | Yamada | ............. | G06K 9/00006 713/186 |
| 2006/0228005 A1* | 10/2006 | Matsugu | ............ | G06K 9/00362 382/116 |
| 2007/0022394 A1* | 1/2007 | Ghosh | ................... | G06F 17/504 716/102 |
| 2007/0255329 A1* | 11/2007 | Bjorling | ................. | A61N 1/371 607/28 |
| 2009/0157877 A1* | 6/2009 | Baek | ................... | H04L 12/2803 709/225 |
| 2012/0280917 A1* | 11/2012 | Toksvig | ................ | G06F 1/1626 345/173 |
| 2014/0157401 A1* | 6/2014 | Alameh | .................. | G06F 21/45 726/17 |
| 2014/0172707 A1* | 6/2014 | Kuntagod | ........ | G06Q 20/40145 705/44 |
| 2015/0119108 A1* | 4/2015 | Philbin | ............. | H04M 1/72594 455/566 |
| 2015/0178580 A1* | 6/2015 | Lai | ..................... | G06K 9/00899 382/116 |
| 2015/0279134 A1* | 10/2015 | Warren | .............. | G07C 9/00039 340/5.85 |
| 2016/0210451 A1* | 7/2016 | Hwang | ................. | G06F 21/316 |
| 2016/0247337 A1* | 8/2016 | Webber | ............. | G06K 7/10297 |

* cited by examiner

CONTEXT-BASED ACCESS VERIFICATION

FIELD OF THE DISCLOSURE

The present disclosure relates to accessing electronic devices, and more specifically, to verifying whether to authorize access to electronic devices.

DESCRIPTION OF RELATED ART

In recent years, the use of electronic devices such as smartphones, tablet computers, wearable computers, and the like has been increasing. Such electronic devices may provide a variety of functionalities or capabilities such as data processing, data and/or voice communication, web browsing, gaming, etc. In addition, a variety of functions or applications such as an email application, a messaging application, a banking application, a multimedia application, etc. may be provided in such electronic devices for convenience of users.

Conventional electronic devices often store or provide access to personal or private information. For example, entails in an electronic device may include confidential information for personal or business use. Similarly, an electronic device may allow a user to access confidential financial information such as an account number and an account balance. To prevent an unauthorized user from accessing such confidential information, conventional electronic devices often provide one or more security features to limit access to such electronic devices. For example, an electronic device may require a user to be verified before allowing access to the electronic device.

Some conventional electronic devices may verify a user in response to a verification input such as a sound from the user or an image of the user. For example, a user may speak a sound or provide a facial image of the user to unlock an electronic device. However, such inputs are often subject to an environmental condition of the electronic device that may vary depending on a location, time, etc. In the case of an input sound received in a noisy shopping center, for example, a background noise of the electronic device may degrade the quality of the input sound so that the user may not be verified from the input sound. Similarly, when an outdoor image of the user is received at night, the image may not be of sufficient quality to allow verification of the user. Accordingly, the electronic device may not be able to properly verify the user for accessing the electronic device.

SUMMARY OF THE INVENTION

The present disclosure relates to verifying whether a user is authorized to access an electronic device based on sensor data and context information of the electronic device.

According to one aspect of the present disclosure, a method, performed by an electronic device, for verifying a user to allow access to the electronic device is disclosed. In this method, sensor data may be received from a plurality of sensors including at least an image sensor and a sound sensor. Context information of the electronic device may be determined based on the sensor data and at least one verification unit may be selected from a plurality of verification units based on the context information. Each of the plurality of verification units may be capable of verifying whether the user is authorized to access the electronic device. Based on the sensor data from at least one of the image sensor or the sound sensor, the at least one selected verification unit may calculate at least one verification value. Each of the at least one verification value may indicate at least one of an authorized user or a predetermined access command. It may be determined whether to allow the user to access the electronic device based on the at least one verification value and the context information. This disclosure also describes apparatus, a device, a server, a system, a combination of means, and a computer-readable medium relating to this method.

According to another aspect of the present disclosure, an electronic device for verifying a user to allow access to the electronic device is disclosed. The electronic device may include a processor configured to receive sensor data from a plurality of sensors including at least an image sensor and a sound sensor. The processor may include a context information determination unit, a verification management unit, and a verification engine. The context information determination unit may be configured to determine context information of the electronic device based on the sensor data. Further, the verification management unit may be configured to select at least one verification unit from a plurality of verification units based on the context information. Each of the plurality of verification units may be capable of verifying whether the user is authorized to access the electronic device. The verification engine may include the plurality of verification units, and the at least one selected verification unit may be configured to calculate the at least one verification value based on the sensor data from at least one of the image sensor or the sound sensor. Each of the at least one verification value is indicative of at least one of an authorized user or a predetermined access command. The verification management unit may then determine whether to allow the user to access the electronic device based on the at least one verification value and the context information.

BRIEF DESCRIPTION OF THE DRAWINGS

Embodiments of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the inventive aspects of this disclosure. However, it will be apparent to one of ordinary skill in the art that the inventive aspects of this disclosure may be practiced without these specific details. In other instances, well-known methods, procedures, systems, and components have not been described in detail so as not to unnecessarily obscure aspects of the various embodiments.

Figure 1:
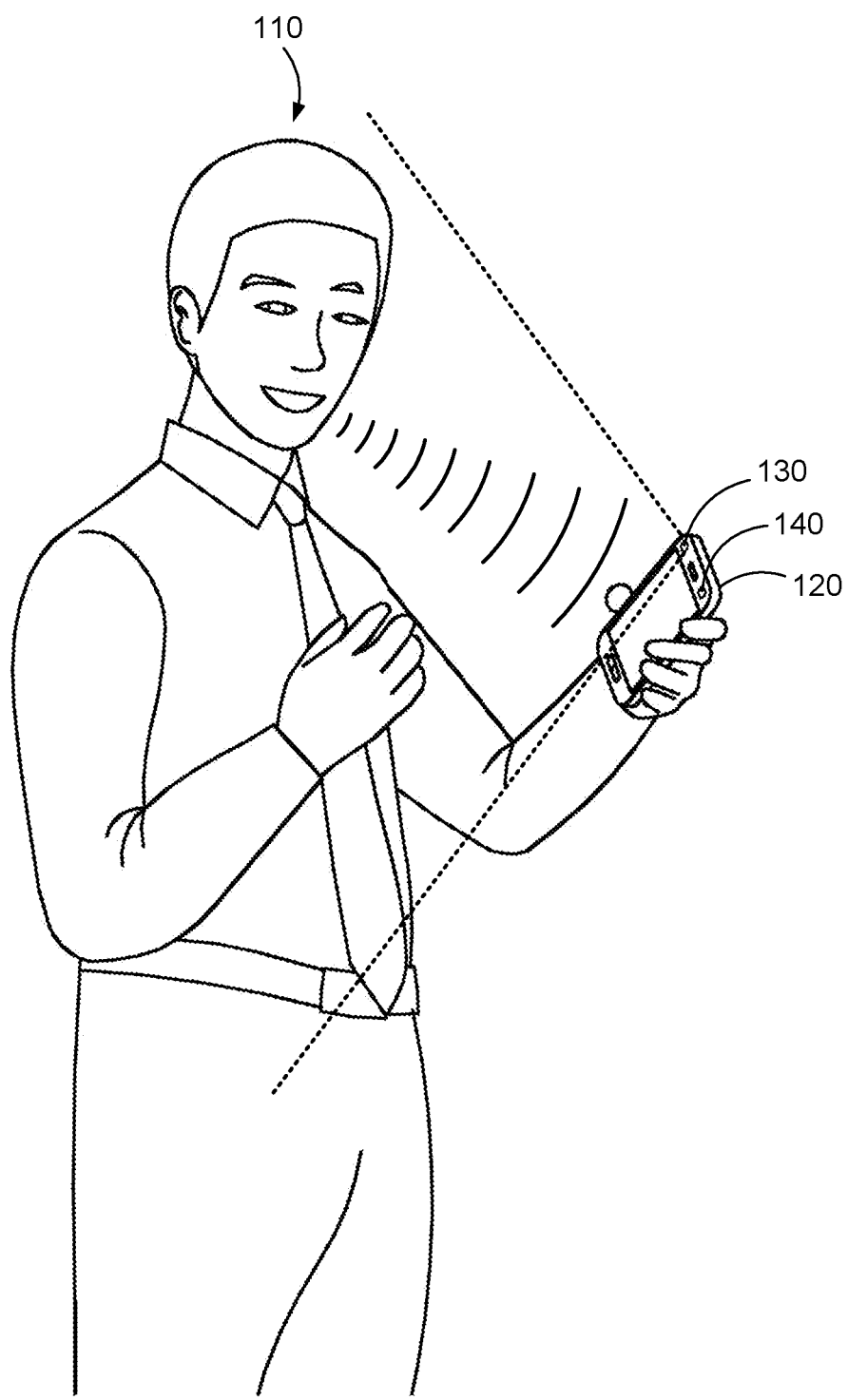
FIG. 1 illustrates an electronic device configured to verify a user to allow access to the electronic device based on sensor data and context information of the electronic device, according to one embodiment of the present disclosure.

FIG. 1 illustrates an electronic device 120 configured to verify a user 110 to allow access to the electronic device 120 based on sensor data and context information of the electronic device 120, according to one embodiment of the present disclosure. As shown, the electronic device 120 may be equipped with an image sensor 130 and a sound sensor 140. The user 110 may speak a predetermined command to access the electronic device 120. For example, while the electronic device 120 is in a locked or deactivated mode, the user 110 may speak a predetermined command to unlock or activate the electronic device 120 for accessing the electronic device 120. The electronic device 120 may receive an input sound including the command via the sound sensor 140 and capture one or more images of the user 110 via the image sensor 130. As illustrated herein, the electronic device 120 may be any suitable device adapted to receive and process images and sounds such as a smartphone, a digital camera (e.g., a DSLR camera), a wearable computer (e.g., smart glasses, a smart watch, etc.), a personal computer, a laptop computer, a tablet computer, a gaming device, etc. As used herein, the term "context information" of an electronic device may be any data or information describing or characterizing an environmental condition (e.g., a brightness level, a sound level, etc.) of the electronic device, an activity (e.g., an act, a motion, a speech, etc.) of a user of the electronic device, a location or a power status of the electronic device, and/or a security level associated with an event (e.g., a message, an e-mail, a phone call, etc.) in the electronic device.

The electronic device 120 may receive, as sensor data, the input sound including the predetermined command via the sound sensor 140 and the one or more images indicative of the user (e.g., a face, a lip, a hand, etc.) via the image sensor 130. The input sound received by the sound sensor 140 may include a sound indicative of the predetermined command from the user 110 and an environmental sound. Similarly, the one or more images may include an indication of the user 110 and an indication of an environment for the user 110 or the electronic device 120 (e.g., a background image of the user or the electronic device 120). In one embodiment, the one or more images indicative of the user 110 may include a plurality of images indicative of a lip movement of the user 110 corresponding to the predetermined command. Additionally or alternatively, the user 110 may issue a predetermined command to access the electronic device 120 by making a motion or gesture (e.g., a hand or facial gesture), which may be captured as one or more images for use as sensor data. Although the electronic device 120 is shown with the image sensor 130 and the sound sensor 140, it may also include any other sensors adapted to receive other types of sensor data, as will be described in more detail with reference to FIG. 3.

Upon receiving the sensor data from the image sensor 130 and the sound sensor 140, the electronic device 120 may determine context information of the electronic device 120 based on the sensor data. For example, the context information of the electronic device 120 may include an indication of quality of image data from the image sensor 130 and quality of sound data from the sound sensor 140. In one embodiment, the electronic device 120 may calculate one or more reliability values indicative of data quality of the sensor data from the image sensor 130 and the sound sensor 140. The reliability values indicative of data quality for the sensor data from the image sensor 130 and the sound sensor 140 may then be used as context information of the electronic device 120 for determining whether to authorize access to the electronic device 120.

According to one embodiment, the electronic device 120 may determine a reliability value for one or more images of the user 110 based on one or more image parameters of the images such as a sharpness value, a brightness value, a contrast value, a saturation value, and the like. For example, a reliability value for an image of the user 110 may be determined by comparing image parameters of the image with reference image parameters of a reference image, which may include the user 110. Based on such comparison, the electronic device 120 may calculate reliability values for images taken under various environmental conditions. For example, a low reliability value may be calculated for an image taken under a low visibility condition (e.g., a low light condition) while a high reliability value may be determined for an image taken under an optimum lighting condition.

In the case of a plurality of images, a reliability value may be determined for each of the images and an average reliability value may be used as the reliability value for the images. Alternatively, one of the images having a highest reliability value may be selected and the reliability value of the selected image may be used as the reliability value of the images. As will be described in more detail below, the electronic device 120 may use a reliability value associated with one or more images as context information indicating reliability of the images or the image sensor 130 in determining whether the user 110 is authorized to access the electronic device 120.

Additionally, the electronic device 120 may determine a reliability value for the input sound received from the sound sensor 140 as sensor data. In one embodiment, an SNR (signal-to-noise ratio) of the speech of the user 110, which corresponds to the predetermined command, to background sound or noise (e.g., environmental sound) in the input sound may be calculated and used as the reliability value for the input sound. Additionally or alternatively, a loudness level of the speech of the user 110 in the input sound and/or a noise level in the input sound may be calculated and used as the reliability value for the input sound. As will be described in more detail below, the electronic device 120 may use a reliability value associated with an input sound as context information indicating reliability of the input sound or the sound sensor 140 in determining whether the user 110 is authorized to access the electronic device 120. Although the electronic device 120 determines context information of the electronic device 120 based on sensor data from the image sensor 130 and the sound sensor 140, it may also determine context information based on other types of sensor data, which may be received from any other sensors, as will be described in more detail with reference to FIG. 6.

Based on the context information of the electronic device 120, the electronic device 120 may select one or more verification units from a plurality of verification units, which may be included in the electronic device 120. Each of the verification units may be capable of verifying whether the user 110 is authorized to access the electronic device 120. According to one embodiment, the plurality of verification units in the electronic device 120 may include a face verification unit, a voice verification unit, and a lip movement verification unit, which may be selected based on the context information. For example, if a reliability value for an image of the user 110 is greater than or equal to a predetermined reliability threshold and a reliability value for an input sound is lower than a predetermined reliability threshold, the electronic device 120 may select the face verification unit and the lip movement verification unit for use in verifying the user 110 to allow access to the electronic device 120. In this case, the voice verification unit may not be selected due to the low reliability value of the input sound. Although the electronic device 120 is described as including the face verification unit, the voice verification unit, and the lip movement verification unit, it may also include any other verification units for verifying whether the user 110 is authorized to access the electronic device 120, as will be described in more detail with reference to FIG. 4.

The selected verification units in the electronic device 120 may calculate one or more verification values for the user 110 based on the sensor data. As used herein, a verification value may be indicative of at least one of an authorized user or a predetermined command for accessing the electronic device 120. For example, the verification value may be a value or a score indicating a probability that the user 110 is a user authorized to access the electronic device 120. Additionally or alternatively, the verification value may also be a value or a score indicating a probability that an input command from the user 110 is a predetermined command for accessing the electronic device 120.

According to one embodiment, each of the selected verification units may calculate a verification value based on sensor data associated with the verification unit. For example, if the face verification unit and the lip movement verification unit are selected, each of the face verification unit and the lip movement verification unit may receive one or more images from the image sensor as sensor data and calculate a verification value for the user 110 based on the received images. The verification value calculated by the face verification unit may indicate a probability that the user 110 in the images is an authorized user and/or a probability that a facial expression or a hand gesture in the images is a facial expression or a hand gesture indicative of a predetermined command to access the electronic device 120. On the other hand, the verification value calculated by the lip movement verification unit may indicate a probability that a lip movement of the user 110 in the images is a lip movement indicative of a predetermined command.

Based on the verification values from the selected verification units and the context information, the electronic device 120 may determine one or more weights for the selected verification units based on the context information. In one embodiment, the face verification unit, the voice verification unit, and the lip movement verification unit may be selected based on a high reliability value for one or more images of the user 110 and a high reliability value for an input sound. In this case, the electronic device 120 may assign a weight for each of the face verification unit, the voice verification unit, and the lip movement verification unit based on the context information. For example, if the reliability value for the images is greater than the reliability value for the input sound, the weights assigned for the verification values calculated by the face verification unit and the lip verification unit may be greater than the weight assigned for the verification value calculated by the voice verification unit. In this manner, the electronic device 120 may assign a weight to each of the selected verification units according to a reliability value of input sensor data for the verification unit.

Upon determining one or more verification values by the selected verification units and one or more weights associated with the selected verification units, the electronic device 120 may determine a weighted verification value for each of the verification values. For example, the electronic device 120 may calculate a weighted verification value for each of the verification values by multiplying the verification value and the associated weight. In one embodiment, the electronic device 120 may then generate a weighted verification value for the selected verification units by summing the weighted verification values. Based on the weighted verification value for the selected verification units, the electronic device 120 may determine whether the user 110 is authorized to access the electronic device 120. For example, if the weighted verification value for the selected verification units is greater than or equal to a predetermined threshold verification value, the electronic device 120 may allow the user 110 to access the electronic device 120.

Figure 2:
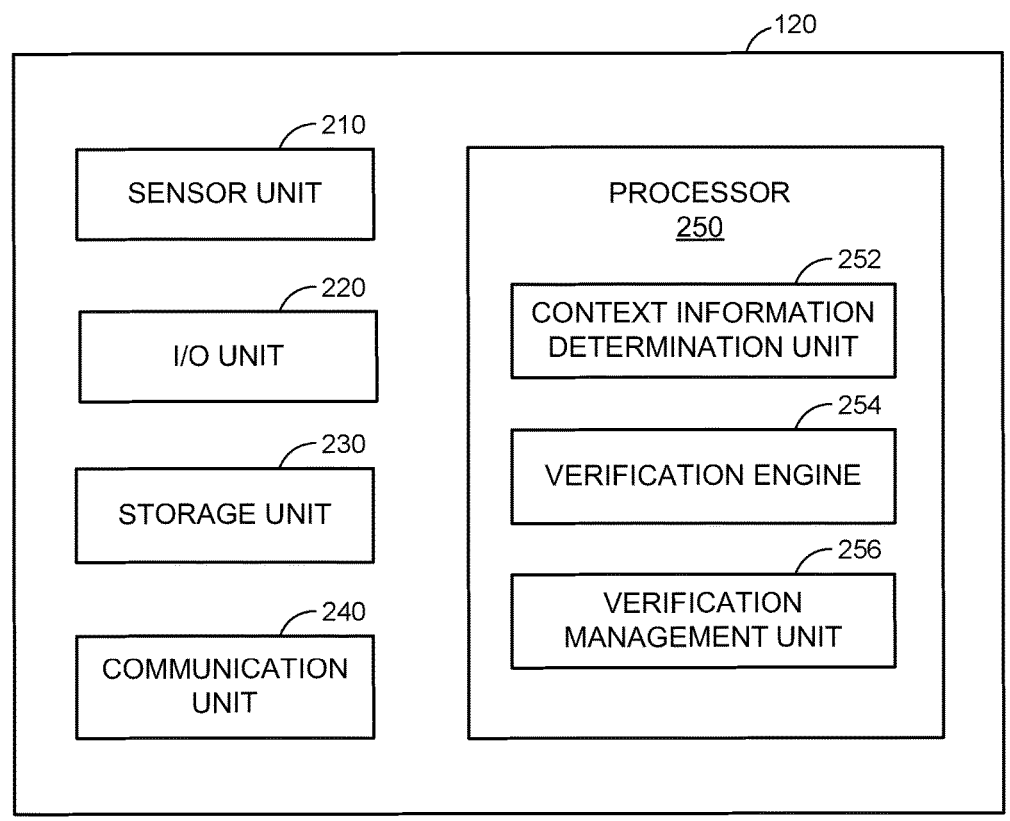
FIG. 2 is a block diagram of an electronic device configured to verify whether a user is authorized to access the electronic device based on sensor data and context information, according to one embodiment of the present disclosure.

FIG. 2 is a block diagram of the electronic device 120 configured to verify whether a user is authorized to access the electronic device 120 based on sensor data and context information, according to one embodiment of the present disclosure. The electronic device 120 may include a sensor unit 210, an I/O unit 220, a storage unit 230, a communication unit 240, and a processor 250. The processor 250 may include a context information determination unit 252, a verification engine 254, and a verification management unit 256.

The sensor unit 210 may be configured to include a plurality of sensors such as an image sensor 130, a sound sensor 140, a fingerprint scanner, a touch sensor, a motion sensor, a power sensor, and a location sensor, and the like, as will be described in more detail with reference to FIG. 3.

The sensor unit 210 may receive one or more inputs such as an input sound, one or more images of the user, an environmental condition or motion of a user or the electronic device 120, and the like, and generate sensor data from the received inputs. The sensor unit 210 may be configured to continuously or periodically monitor one or more inputs. Alternatively, one or more inputs may be received when an input from the user or a portion of the input is detected. The sensor data may be provided to the processor 250 for use in detecting an authorized user or a user's command to access the electronic device 120 and determining context information of the electronic device 120.

The I/O unit 220 may be configured to receive commands from a user and/or output information for the user. As described herein, the I/O unit 220 may be any suitable device capable of receiving commands and/or outputting information. In one embodiment, the I/O unit 220 may include an input unit such as a touch screen, a button, a keypad, a touchpad, or the like and an output unit such as a display screen, a speaker, a vibrator, etc. In some embodiments, one or more sensors in the sensor unit 210 such as a touch sensor may be provided in the I/O unit 220.

The storage unit 230 in the electronic device 120 may store a command database of one or more predetermined commands for accessing the electronic device 120. The command database may be accessed by the verification engine 254 in the processor 250 for verifying whether to authorize access to the electronic device 120. The command database may include one or more predetermined facial expressions or gestures, one or more predetermined hand gestures, one or more predetermined lip movements, one or more predetermined keywords, one or more patterns of motion of the electronic device 120, etc. Additionally or alternatively, the command database may be stored in an external storage device and may be accessed via the communication unit 240 over a communication network.

In some embodiments, the storage unit 230 may store a security level database, which may be accessed by the context information determination unit 252 in the processor 250, for use in determining context information of the electronic device 120. The security level database may assign a plurality of security levels to a plurality of predetermined locations and events. For example, different security levels may be assigned to a home of a user, a workplace of the user, a public location, etc. based on desired privacy levels associated with the locations. Similarly, different security levels may be assigned to different events such as a message, an e-mail, a phone call, etc. according to privacy levels associated with such events. In one embodiment, a security level associated with a predetermined location or event may be used to adjust a number of verification units that may be selected. The storage unit 230 may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive).

The context information determination unit 252 in the processor 250 may be configured to receive sensor data from the sensor unit 210 and determine context information of the electronic device 120 based on the sensor data. In one embodiment, the context information of the electronic device 120 may be determined based on sensor data from one or more sensors such as the image sensor 130, the sound sensor 140, a fingerprint scanner, a motion sensor, a power sensor, a location sensor in the sensor unit 210, as will be described in more detail with reference to FIG. 7. Additionally, the context information determination unit 252 may receive a notification of a predetermined event from the processor 250 such as a receipt of a message, an e-mail, etc. and determine a security level for the event based on the security level database in the storage unit 230. In this case, the security level associated with the event may be included in the context information of the electronic device 120. The context information may then be provided to the verification management unit 256 in the processor 250.

The verification engine 254 may include a plurality of verification units such as a face verification unit, a voice verification unit, a lip movement verification unit, a passcode verification unit, a fingerprint verification unit, a retina verification unit, a motion verification unit, and a gesture verification unit, as will be described in more detail with reference to FIG. 4. Each of the verification units in the verification engine 254 may be configured to receive sensor data associated with the verification unit from the sensor unit 210 and calculate one or more verification values based on the sensor data. For example, a verification value output from a verification unit may indicate a probability that the sensor data received by the verification unit is indicative of a user authorized to access the electronic device 120. Additionally or alternatively, a verification value generated by a verification unit may indicate a probability that an input command in the sensor data received by the verification unit is a predetermined command for accessing the electronic device 120.

The verification management unit 256 may receive context information of the electronic device 120 from the context information determination unit 252 and select one or more verification units from the plurality of verification units in the verification engine 254. According to one embodiment, one or more verification units may be selected from the plurality of verification units in the verification engine 254 based on one or more reliability values of the sensor data, which may be included in the context information. According to another embodiment, the verification management unit 256 may receive context information of the electronic device 120 that includes a security level associated with a location or an event. In this case, a predetermined number of verification units from the plurality of verification units or the selected verification units may be selected based on the security level.

The verification management unit 256 may then generate one or more signals indicating the selected verification units and transmit the signals to the verification engine 254, which may activate the selected verification units in response. Alternatively, the verification management unit 256 may activate the selected verification units in the verification engine 254. Upon being activated, each of the selected verification units in the verification engine 254 may calculate a verification value based on the sensor data associated with the verification unit. The verification engine 254 may then provide the verification values generated by the selected verification units to the verification management unit 256.

Upon receiving one or more verification values from the verification engine 254 and context information of the electronic device 120 from the context information determination unit 252, the verification management unit 256 may determine whether to authorize access to the electronic device 120. In this process, the verification management unit 256 may assign a weight to each of the selected verification values based on the context information of the electronic device 120 and calculate a weighted verification value for each of the verification values. For example, a weighted verification value for each of the verification values may be calculated by multiplying the verification value and the associated weight. In this case, a weighted verification value for the selected verification units may also be generated by summing the weighted verification values. The verification management unit 256 may then determine whether to authorize access to the electronic device 120 based on the weighted verification value for the selected verification units.

Figure 3:
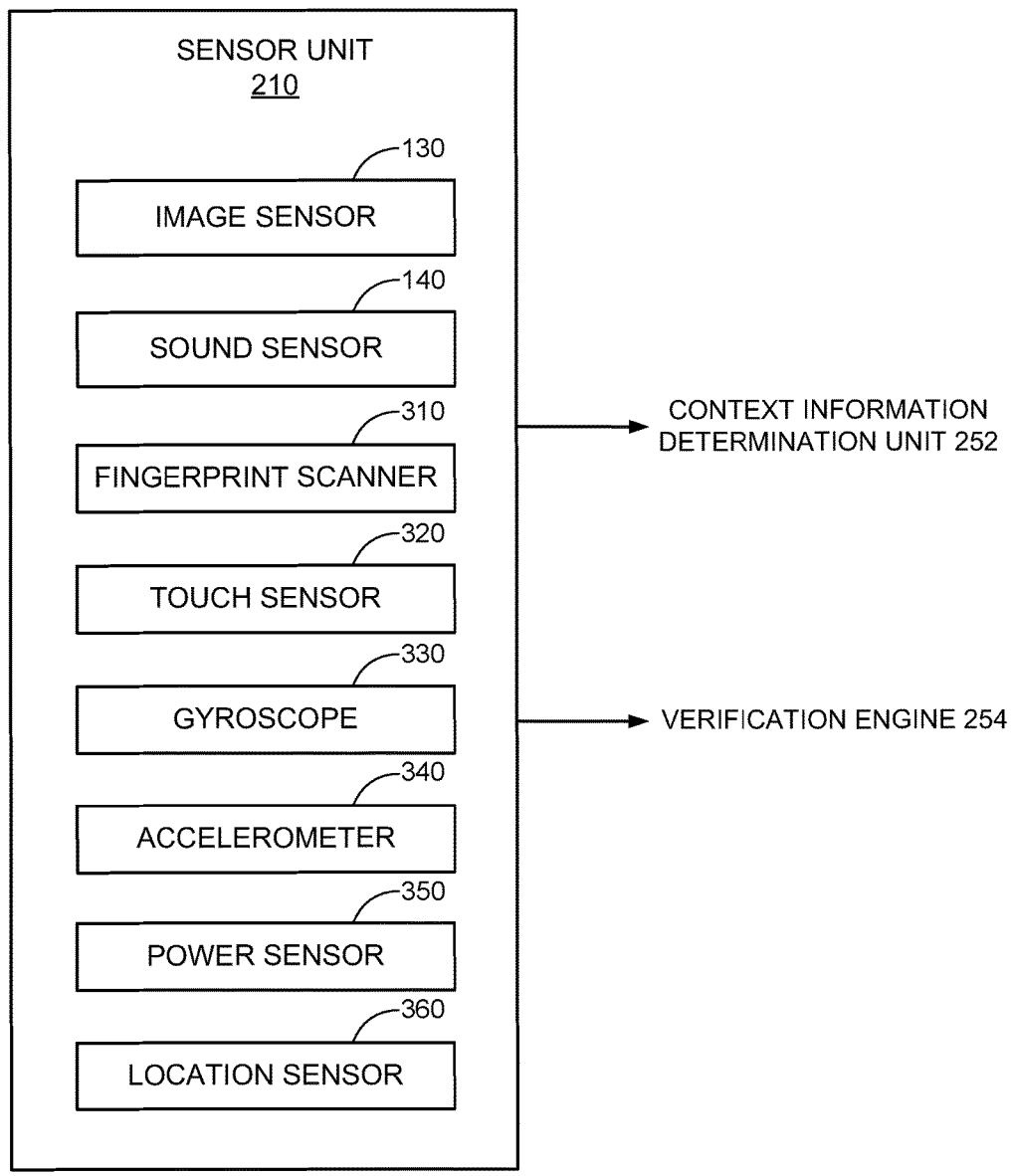
FIG. 3 illustrates a detailed block diagram of a sensor unit configured to generate sensor data from one or more inputs and provide the sensor data to a context information determination unit and a verification engine, according to one embodiment of the present disclosure.

FIG. 3 illustrates a detailed block diagram of the sensor unit 210 configured to generate sensor data from one or more inputs and provide the sensor data to the context information determination unit 252 and the verification engine 254, according to one embodiment of the present disclosure. The sensor unit 210 may include the image sensor 130, the sound sensor 140, a fingerprint scanner 310, a touch sensor 320, a gyroscope 330, an accelerometer 340, a power sensor 350, and a location sensor 360. The sensors 130, 140, 310, 320, 330, 340, 350, and 360 in the sensor unit 210 may receive one or more inputs and generate sensor data, which may be provided to the context information determination unit 252 and the verification engine 254.

The image sensor 130 may capture one or more images including a user such as a face, eyes, a lip, a hand, etc. The one or more images may also include a background image of the user or the electronic device 120. According to one embodiment, the image sensor 130 may capture a plurality of images of the user's lip movement when the user speaks a predetermined command. Additionally or alternatively, the images may include a motion or gesture such as a hand or facial gesture of the user. The image sensor 130 may provide the images as sensor data to the context information determination unit 252 and the verification engine 254 in the processor 250. As described herein, the image sensor 130 may be any suitable image sensing device (e.g., a camera or a camera module) capable of capturing or sensing an image of a scene or an object.

The sound sensor 140 may be configured to receive an input sound and convert the input sound into sound data, which may be output as sensor data. The sound sensor 140 may include one or more microphones or any other types of sound sensors that can be used to receive, capture, sense, and/or detect a sound input, and may employ any suitable software and/or hardware for such functions. According to one embodiment, the sound sensor 140 may receive an input sound including a predetermined command spoken from a user to access the electronic device 120. The input sound may also include an environmental sound of the electronic device 120 or the user such as background sound, noise, etc. As the input sound is received, the sound sensor 140 may generate sensor data, which may be provided to the context information determination unit 252 and the verification engine 254.

The fingerprint scanner 310 may be configured to scan a finger (e.g., a fingerprint) and generate an image of the finger as sensor data. In one embodiment, the fingerprint scanner 310 may generate an image of a finger of a user when the user's finger is detected by the fingerprint scanner 310. The image may include one or more patterns (e.g., an arch, a loop, a whorl, etc.) or features (e.g., a ridge ending, a bifurcation, a short ridge, etc.) of the fingerprint, which may be used in verifying whether the user is authorized to access the electronic device. The fingerprint scanner 310 may provide the image including the fingerprint as sensor data to the context information determination unit 252 and the verification engine 254.

The touch sensor 320 may be configured to receive a touch input from a user and generate sensor data corresponding to the touch input. A user may touch or contact the touch sensor 320 such as a touch screen to input a passcode or a password to access to the electronic device 120. The touch sensor 320 may detect the passcode or password, which may be provided to the verification engine 254 as sensor data. As used herein, the touch sensor 320 may include one or more capacitance sensors or any other types of touch sensors that can be used to receive, sense, and/or detect a touch input to the electronic device 120.

The gyroscope 330 and the accelerometer 340 may be configured to monitor an orientation and/or acceleration of the electronic device 120 and generate geometric information indicative of the orientation or a motion of the electronic device 120 as sensor data. The gyroscope 330 may detect orientations of the electronic device 120 to track a motion of the electronic device 120. The accelerometer 340 may detect acceleration or orientations of the electronic device 120 for tracking a motion of the electronic device 120. In one embodiment, the detected orientations and/or acceleration may be provided to the verification engine 254 and the context information determination unit 252 as sensor data. Additionally or alternatively, the detected motions may be provided to the verification engine 254 and the context information determination unit 252 as sensor data.

The power sensor 350 may be configured to monitor a status of a power source (e.g., a battery) that may be included in the electronic device 120. In one embodiment, the power sensor 350 may sense or detect an amount of electrical power remaining in the power source. For example, the power sensor 350 may monitor the status of the power source by continuously or periodically detecting an amount of the remaining electrical power in the power source. The status of the power source including the remaining amount of electric power in the power source may be provided as sensor data to the context information determination unit 252.

The location sensor 360 may be configured to detect a current location of the electronic device 120 and output location information for the detected location as sensor data. According to one embodiment, the location sensor 360 may receive and use GPS location information. Additionally or alternatively, the location sensor 360 may receive signals from Wi-Fi access points or cell tower base stations and detect a location of the electronic device 120 based on the intensity of each of the received signals. In this case, the location information may include a set of latitude, longitude, and altitude of the electronic device 120. The location sensor 360 may provide the location information to the context information determination unit 252.

Figure 4:
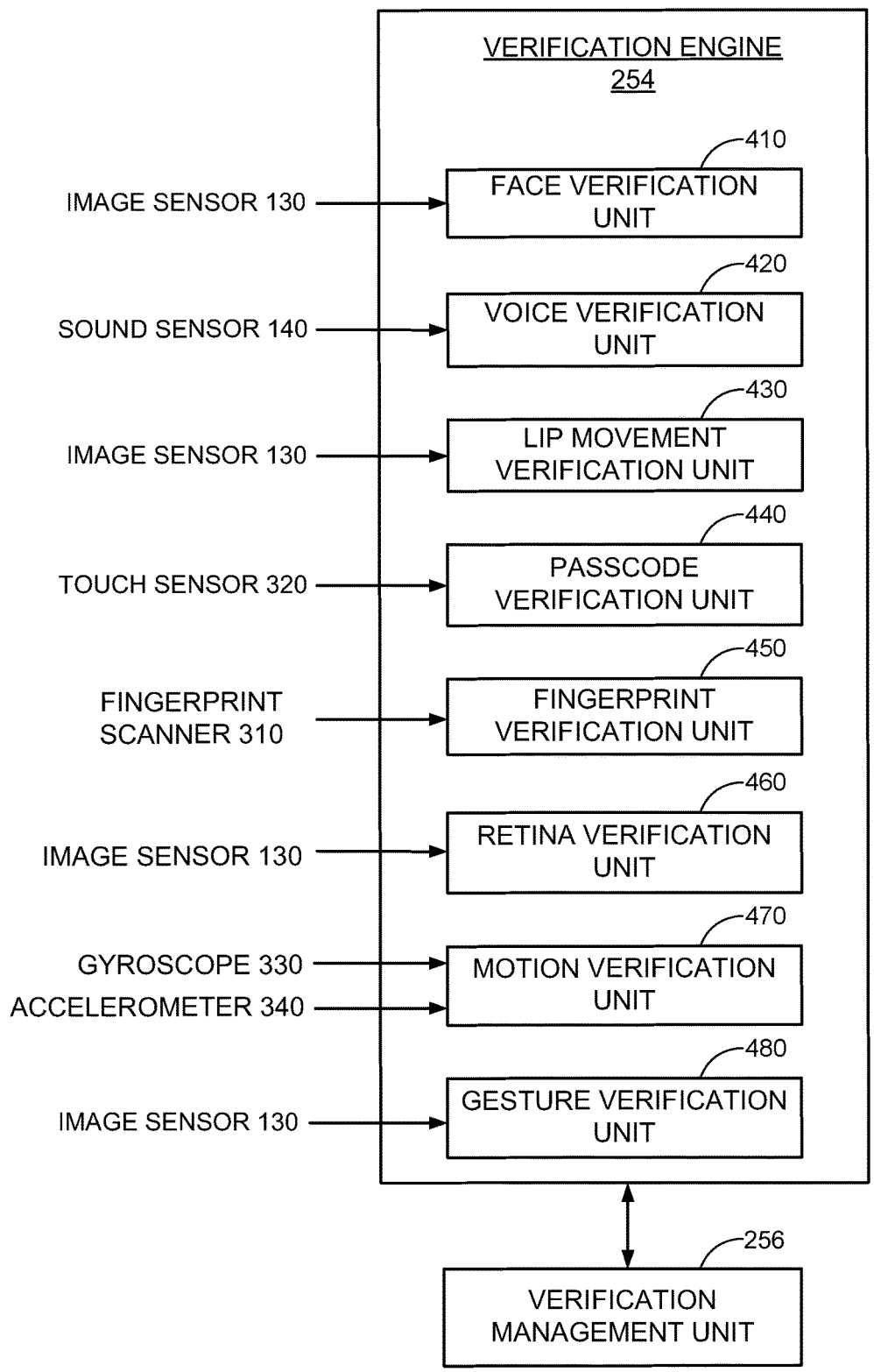
FIG. 4 is a detailed block diagram of a verification engine configured to receive sensor data from a sensor unit and calculate one or more verification values based on the sensor data, according to one embodiment of the present disclosure.

FIG. 4 is a detailed block diagram of the verification engine 254 configured to receive sensor data from the sensor unit 210 and calculate one or more verification values based on the sensor data, according to one embodiment of the present disclosure. As shown, the verification engine 254 may include a face verification unit 410, a voice verification unit 420, a lip movement verification unit 430, a passcode verification unit 440, a fingerprint verification unit 450, a retina verification unit 460, a motion verification unit 470, and a gesture verification unit 480. Each of the verification units 410 to 480 may be configured to receive sensor data from at least one of the sensors in the sensor unit 210 and calculate a verification value indicative of an authorized user and/or a predetermined command for accessing the electronic device 120. In one embodiment, when one or more verification units are selected and activated by the verification management unit 256, each of the verification units 410 to 480 may calculate a verification value, which may be provided to the verification management unit 256.

The face verification unit 410 may be activated in response to being selected by the verification management unit 256. Upon being activated, the face verification unit 410 may receive, as sensor data, an image including a face of a user from the image sensor 130 and calculate a verification value associated with the sensor data. In one embodiment, the verification value calculated by the face verification unit 410 may be indicative of a probability (e.g., a likelihood or a degree of similarity) that the face in the image corresponds to a user authorized to access the electronic device 120. For example, the face verification unit 410 may calculate a verification value by determining a similarity between the user's face in the image and a reference face of the user that may be stored in the storage unit 230. The face verification unit 410 may provide the verification value to the verification management unit 256.

Upon being selected and activated by the verification management unit 256, the voice verification unit 420 may receive an input sound as sensor data from the sound sensor 140 to calculate a verification value associated with the sensor data. The input sound may include an input command spoken from the user for access to the electronic device 120 and an environmental sound or noise. The verification value calculated by the voice verification unit 420 may indicate a probability (e.g., a likelihood or a degree of similarity) that the input command in the input sound corresponds to a predetermined keyword in the command database from the storage unit 230. For example, the voice verification unit 420 may calculate the verification value based on a similarity between the input command and the predetermined keyword. The verification value calculated by the voice verification unit 420 may then be provided to the verification management unit 256.

The lip movement verification unit 430 may receive a signal indicating the lip movement verification unit 430 is selected and be then activated. Once the lip movement verification unit 430 is activated, a plurality of images including a lip movement of a user may be received as sensor data from the image sensor 130. The lip movement verification unit 430 may calculate a verification value associated with the received sensor data. For example, the lip movement may correspond to an input command, which may be spoken by the user before the sound sensor 140 in the electronic device 120. The verification value calculated by the lip movement verification unit 430 may indicate a probability (e.g., a likelihood or a degree of similarity) that the lip movement in the images corresponds to a predetermined lip movement in the command database from the storage unit 230. In one embodiment, the lip movement verification unit 430 may calculate the verification value by comparing the lip movement in the image and the predetermined lip movement in the command database. The lip movement verification unit 430 may then provide the verification value to the verification management unit 256.

The passcode verification unit 440 may receive sensor data including a passcode from the touch sensor 320 and calculate a verification value associated with the sensor data upon being selected and activated by the verification management unit 256. The sensor data may also include a password, a pattern, or the like, which may be input by a user via the touch sensor 320 for accessing the electronic device 120. In one embodiment, the passcode verification unit 440 may compare the passcode in the sensor data to a predetermined passcode, which may be stored in the storage unit 230, to calculate a verification value. For example, if it is determined that the passcode in the sensor data is identical to the predetermined passcode, the verification value may be assigned "1." Otherwise, the verification value may be assigned "0." The verification value calculated by the passcode verification unit 440 may be provided to the verification management unit 256.

The fingerprint verification unit 450 may be activated in response to being selected by the verification management unit 256. Upon being activated, the fingerprint verification unit 450 may receive an image including a fingerprint as sensor data from the fingerprint scanner 310 and calculate a verification value associated with the sensor data. In one embodiment, the fingerprint verification unit 450 may detect the fingerprint in the image and compare one or more patterns (e.g., an arch, a loop, a whorl, etc.) or features (e.g., a ridge ending, a bifurcation, a short ridge, or the like) of the fingerprint to patterns or features of a predetermined fingerprint, which may be stored in the storage unit 230. Based on such comparison results, the fingerprint verification unit 450 may calculate a verification value indicative of a similarity between the fingerprint in the sensor data and the predetermined fingerprint. The fingerprint verification unit 450 may provide the verification value as calculated to the verification management unit 256.

Upon being activated by the verification management unit 256, the retina verification unit 460 may receive an image including an eye of a user as sensor data from the image sensor 130 and calculate a verification value associated with the sensor data. The verification value calculated by the retina verification unit 460 may indicate a probability (e.g., a likelihood or a degree of similarity) that the retina of the user's eye in the images is a predetermined retina, which may be stored in the storage unit 230. In one embodiment, the retina verification unit 460 may calculate a verification value based on a similarity between the retina in the image and the predetermined retina. The calculated verification value may then be provided to the verification management unit 256.

Upon being selected and activated by the verification management unit 256, the motion verification unit 470 may be configured to receive orientations and/or acceleration of the electronic device 120 as sensor data from the gyroscope 330 and/or the accelerometer 340 for calculating a verification value associated with the sensor data. The motion verification unit 470 may determine and track a motion of the electronic device 120 based on the received orientations/acceleration of the electronic device 120 and calculate a verification value for the motion of the electronic device 120. Additionally or alternatively, a detected motion of the electronic device 120 may be received from the gyroscope 330 and/or the accelerometer 340 and be used to calculate a verification value. The verification value calculated by the motion verification unit 470 may indicate a probability (e.g., a likelihood or a degree of similarity) that the detected motion of the electronic device 120 corresponds to a predetermined pattern of motion in the command database from the storage unit 230. In one embodiment, the motion verification unit 470 may compare a detected motion of the electronic device 120 and a predetermine pattern of motion to calculate a verification value for the detected motion. The verification value calculated by the motion verification unit 470 may be provided to the verification management unit 256.

Upon being activated by the verification management unit 256, the gesture verification unit 480 may receive a plurality of images including a hand gesture of a user as sensor data and calculate a verification value associated with the sensor data. The verification value calculated by the gesture verification unit 480 may indicate a probability (e.g., a likelihood or a degree of similarity) that a face expression or a hand gesture in the images corresponds to a predetermined facial expression or hand gesture in the command database from the storage unit 230. In one embodiment, the gesture verification unit 480 may compare a face expression or hand gesture in the images to a predetermined facial expression or hand gesture to calculate a verification value indicative of a similarity between the face expression or hand gesture in the images and the predetermined facial expression or hand gesture. The verification value as calculated may then be provided to the verification management unit 256.

Figure 5:
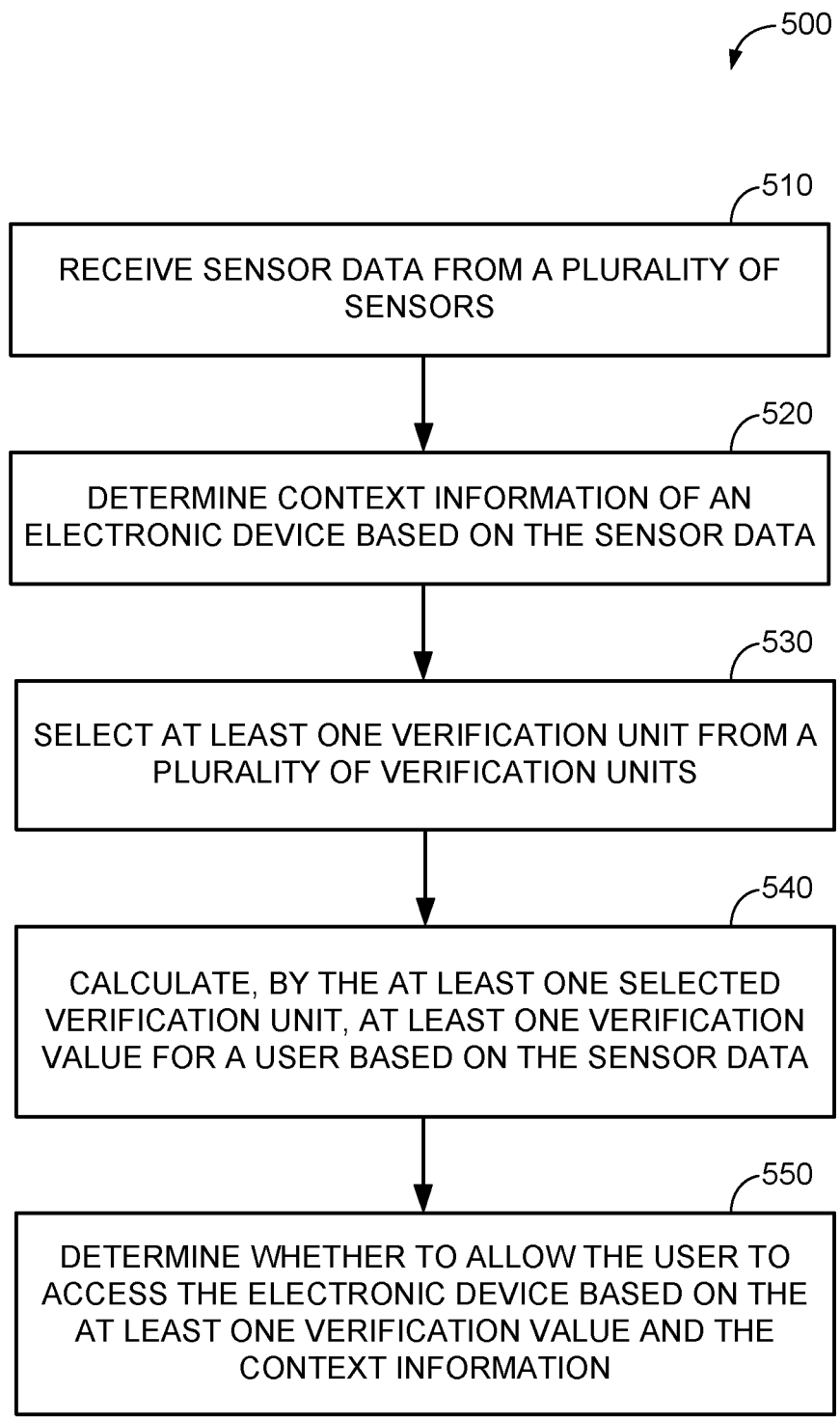
FIG. 5 is a flowchart of a method, performed by an electronic device, for verifying a user to allow access to the electronic device based on sensor data from a plurality of sensors and context information of the electronic device, according to one embodiment of the present disclosure.

FIG. 5 is a flowchart of a method 500, performed by the electronic device 120, for verifying a user to allow access to the electronic device 120 based on sensor data and context information of the electronic device 120, according to one embodiment of the present disclosure. Initially, the processor 250 may receive sensor data from a plurality of sensors in the sensor unit 210 that may include at least the image sensor 130 and the sound sensor 140, at 510. The received sensor data may be provided to the context information determination unit 252 and the verification engine 254. The context information determination unit 252 in the processor 250 may determine context information of the electronic device 120 based on the sensor data, at 520.

At 530, the verification management unit 256 may receive the context information of the electronic device and select at least one verification unit from a plurality of verification units in the verification engine 254. Each of the verification units is capable of verifying whether the user is authorized to access the electronic device 120. At 540, the at least one verification unit in the verification engine 254 may calculate at least one verification value for the user based on the sensor data, upon being selected and activated by the verification management unit 256. Based on the at least one verification value and the context information, the verification management unit 256 may determine whether to allow the user to access the electronic device 120, at 550. In this process, the verification management unit 256 may determine at least one weight for the at least one verification value based on the context information.

Figure 6:
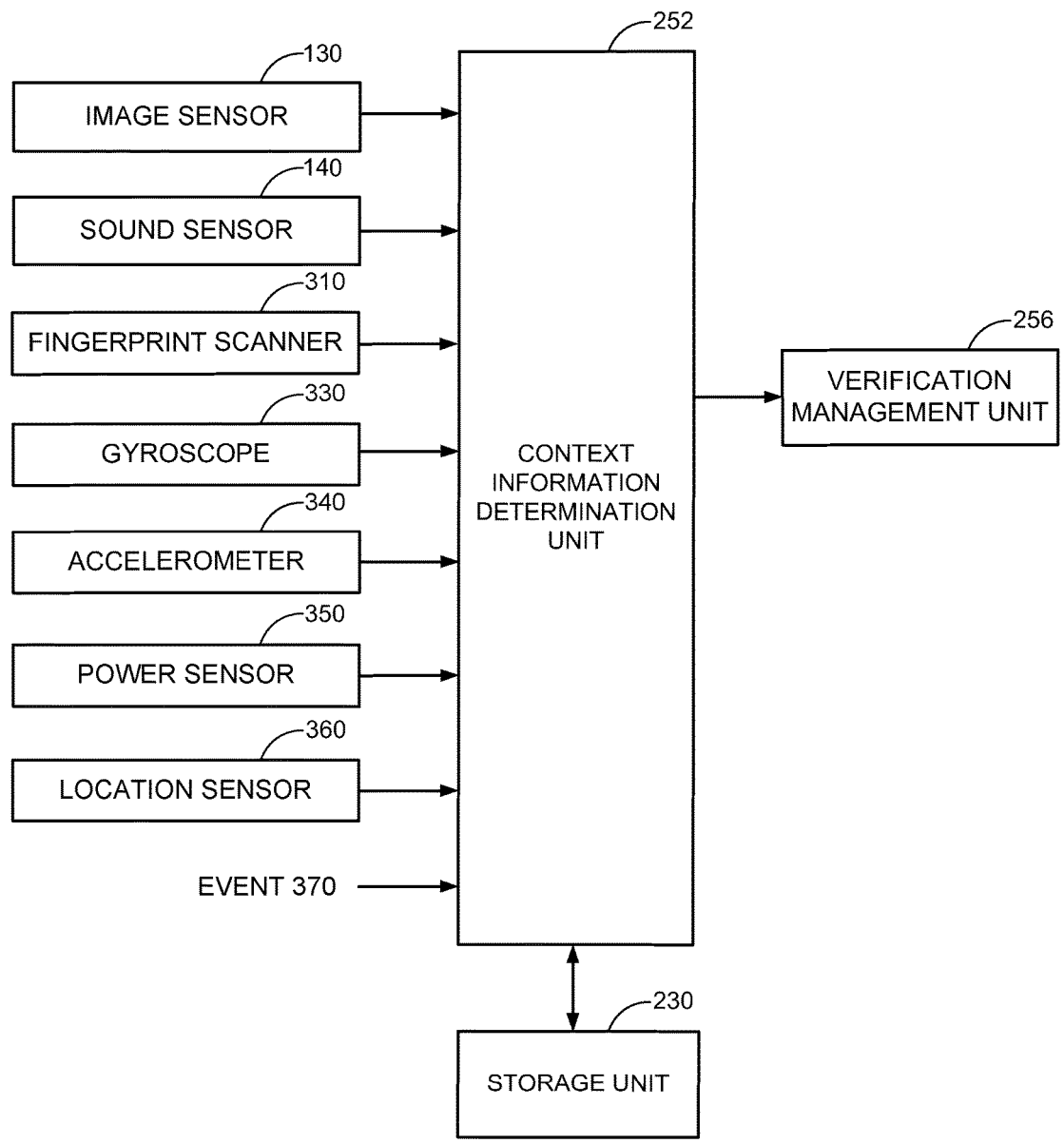
FIG. 6 is a block diagram of a context information determination unit configured to receive sensor data from a sensor unit and a notification of a predetermined event and determine context information of an electronic device, according to one embodiment of the present disclosure.

FIG. 6 is a block diagram of the context information determination unit 252 configured to receive sensor data from the sensor unit 210 and a notification of a predetermined event 370 and determine context information of the electronic device 120, according to one embodiment of the present disclosure. The context information determination unit 252 may receive sensor data from the image sensor 130, the sound sensor 140, the fingerprint scanner 310, the gyroscope 330, the accelerometer 340, the power sensor 350, and the location sensor 360 in the sensor unit 210 to determine context information associated with the sensor data. In addition, a notification of predetermined event such as a receipt of a message, an e-mail, a phone call, or the like may be received from the processor 250 and context information indicative of a security level associated with the event may be determined. According to some embodiments, the context information determination unit 252 may access the security level database in the storage unit 230 to determine context information of the electronic device 120.

The context information determination unit 252 may receive one or more images including a user (e.g., a face, a lip, eyes, etc.) as sensor data from the image sensor 130 and determine image context information associated with the sensor data. In addition, the context information determination unit 252 may receive one or more images including a fingerprint of a user as sensor data from the fingerprint scanner 310 and determine context information associated with the sensor data. The context information for the images received from the image sensor 130 or the fingerprint scanner 310 may include an indication of quality or reliability of the images.

According to one embodiment, the context information determination unit 252 may calculate a reliability value indicative of data quality of the sensor data received from the image sensor 130 or the fingerprint scanner 310. For example, the context information determination unit 252 may determine a reliability value of the images based on one or more parameters of the images indicative of image quality such as a sharpness value, a brightness value, a contrast value, a saturation value, and the like. To calculate the reliability value of the images, the image parameters may be compared with one or more reference image parameters of a reference image including the user or a reference fingerprint of the user that may be stored in the storage unit 230. For example, the reliability value may indicate a degree of similarity between the image parameters and the corresponding image parameters of the reference image. The context information determination unit 252 may then provide the context information associated with the images to the verification management unit 256.

In order to determine sound context information, the context information determination unit 252 may receive an input sound as sensor data from the sound sensor 140. The input sound may include a speech command from the user and an environmental sound or noise (e.g., background sound). In one embodiment, the context information determination unit 252 may determine a reliability value indicative of sound quality for the input sound by calculating an SNR of the speech command to the environmental sound or noise in the input sound, a loudness level of the speech command in the input sound, and/or a noise level in the input sound. For example, a low reliability value may be calculated for an input sound that includes a command spoken by a user in a noisy environment (e.g., a department store, a baseball park, etc.) while a high reliability value may be calculated for an input sound that includes a command spoken by a user in a quiet environment (e.g., a library). The context information determination unit 252 may then provide the reliability value for the input sound as the context information to the verification management unit 256.

For determining context information for a motion of the electronic device 120, the context information determination unit 252 may receive orientations and/or acceleration of the electronic device 120 as sensor data from the gyroscope 330 and/or accelerometer 340. Based on the received sensor data, a motion of the electronic device 120 may be detected. The context information determination unit 252 may then determine context information associated with sensor data from the detected motion of the electronic device 120. In one embodiment, the context information determination unit 252 may determine a reliability value indicative of motion quality of the sensor data from the gyroscope 330 and/or accelerometer 340. For example, a reliability value for the detected motion may be calculated based on a continuity or regularity of the motion of the electronic device 120. If a detected motion is determined to be discontinuous, irregular, and/or random, a low reliability value may be calculated for the motion of the electronic device 120. The reliability value associated with the detected motion may then be provided to the verification management unit 256 as the context information.

In order to determine context information for power status, the context information determination unit 252 may receive, as sensor data, a status of a power source (e.g., a battery) for the electronic device 120. The sensor data indicative of the power status may include an amount of electric power remaining in the power source. In one embodiment, the context information determination unit 252 may determine context information indicative of whether the remaining power of the power source is less than a predetermined threshold power. In this case, the context information may indicate a low power status or a normal power status for the electronic device 120 based on the remaining power of the power source. The context information for the power status of the electronic device 120 may then be provided to the verification management unit 256.

For determining location context information, the context information determination unit 252 may receive location information for a current location of the electronic device 120 as sensor data. In this process, the context information determination unit 252 may access the security level database in the storage unit 230 that may map a plurality of predetermined locations (e.g., a user of a home, a workplace of the user, a public location, etc.) to a plurality of security levels indicative of privacy levels. A security level associated with the current location of the electronic device 120 may be retrieved from the security level database and provided to the verification management unit 256 as the location context information.

In order to determine event context information, the context information determination unit 252 may receive a notification of a predetermined event 370 from the processor 250. In this process, the context information determination unit 252 may access the security level database in the storage unit 230 that may map a plurality of events (e.g., a receipt of a message, e-mail, etc.) to a plurality of security levels. In the security level database, different security levels may be assigned to different events based on privacy levels associated with the events. The context information determination unit 252 may retrieve a security level associated with the received event that may be included in context information of the electronic device 120. The determined security level may then be provided to the verification management unit 256 as the event context information.

Figure 7:
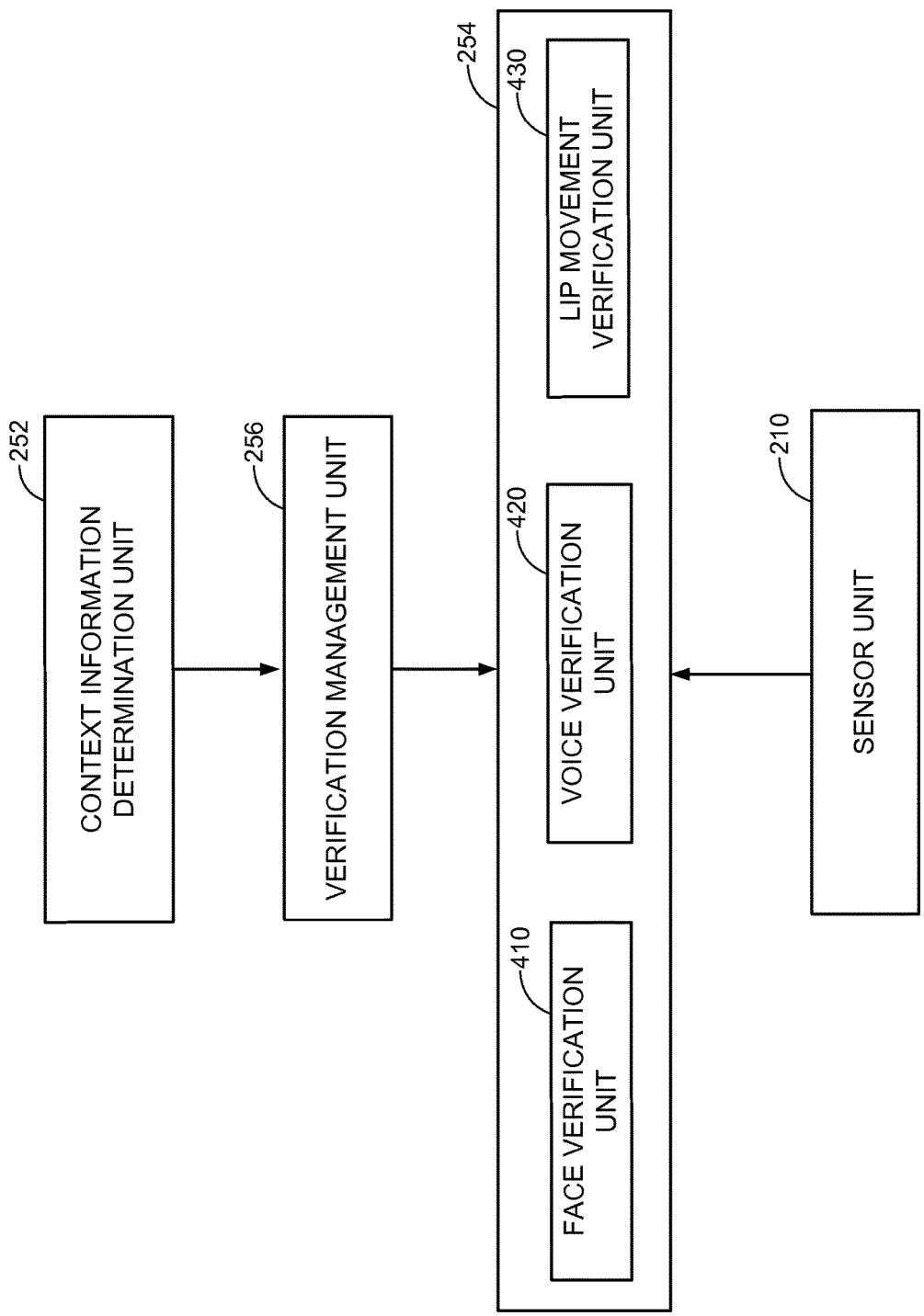
FIG. 7 is a block diagram of a verification management unit configured to select, from a plurality of verification units in a verification engine, one or more verification units based on context information of an electronic device, according to one embodiment of the present disclosure.

FIG. 7 is a block diagram of the verification management unit 256 configured to select, from a plurality of verification units 410, 420, and 430 in the verification engine 254, one or more verification units based on context information of the electronic device 120, according to one embodiment of the present disclosure. The context information may be received from the context information determination unit 252 as described above with reference to FIG. 6. Although the verification engine 254 is illustrated as including the verification units 410, 420, and 430, it may also include the verification units 440, 450, 460, 470, and 480, as described above.

From the context information determination unit 252, the verification management unit 256 may receive context information including one or more reliability values indicative of data quality of one or more images. Based on the reliability values of the images, the verification management unit 256 may determine whether to select the face verification unit 410 and the lip movement verification unit 430. For example, if a reliability value is greater than or equal to a threshold reliability value, the face verification unit 410 and the lip movement verification unit 430 may be selected. Alternatively, different threshold reliability values may be associated with the face verification unit 410 and the lip movement verification unit 430. In this case, the face verification unit 410 and the lip movement verification unit 430 may be selected based on the associated threshold values. Similarly, the verification management unit 256 may determine whether the voice verification unit 420 is selected based on sound context information received from the context information determination unit 252. In this case, the sound context information may include a reliability value for an input sound received as sensor data from the sound sensor 140.

In some embodiments, the verification management unit 256 may receive context information indicative of power status of the electronic device 120 from the context information determination unit 252. The context information may include information indicating whether the remaining power of the electronic device 120 is less than a predetermined threshold power. If the context information indicates that the remaining power is less than the predetermined threshold power, the verification management unit 256 may select one or more predetermined verification units that may require less power than other verification units. For example, the verification management unit 256 may select the voice verification unit 420, which may require less power than the face verification unit 410 and the lip movement verification unit 430.

The verification management unit 256 may additionally receive location context information for a current location of the electronic device 120. The context information may include a security level associated with the location of the electronic device 120. Similarly, the verification management unit 256 may receive, as event context information, a security level associated with a predetermined event such as a receipt of a message, an email, a phone call, etc. Upon receiving the context information indicative of a security level associated with a location of the electronic device 120 or a predetermined event, the verification management unit 256 may select a predetermined number of verification units or predetermined verification units associated with the security level among the plurality of verification units 410, 420, and 430. For example, if the security level is high, the predetermined number of verification units associated with the security level may be high. In this case, the verification management unit 256 may select the face verification unit 410, the voice verification unit 420, and the lip movement verification unit 430 in the verification engine 254. On the other hand, if the security level is low, a lower number of verification units may be selected from the verification engine 254. Once one or more verification units in the verification engine 254 are selected, the verification management unit 256 may generate one or more activation signals, which may be provided to the verification engine 254 or the selected verification units for activating the selected verification units.

Figure 8:
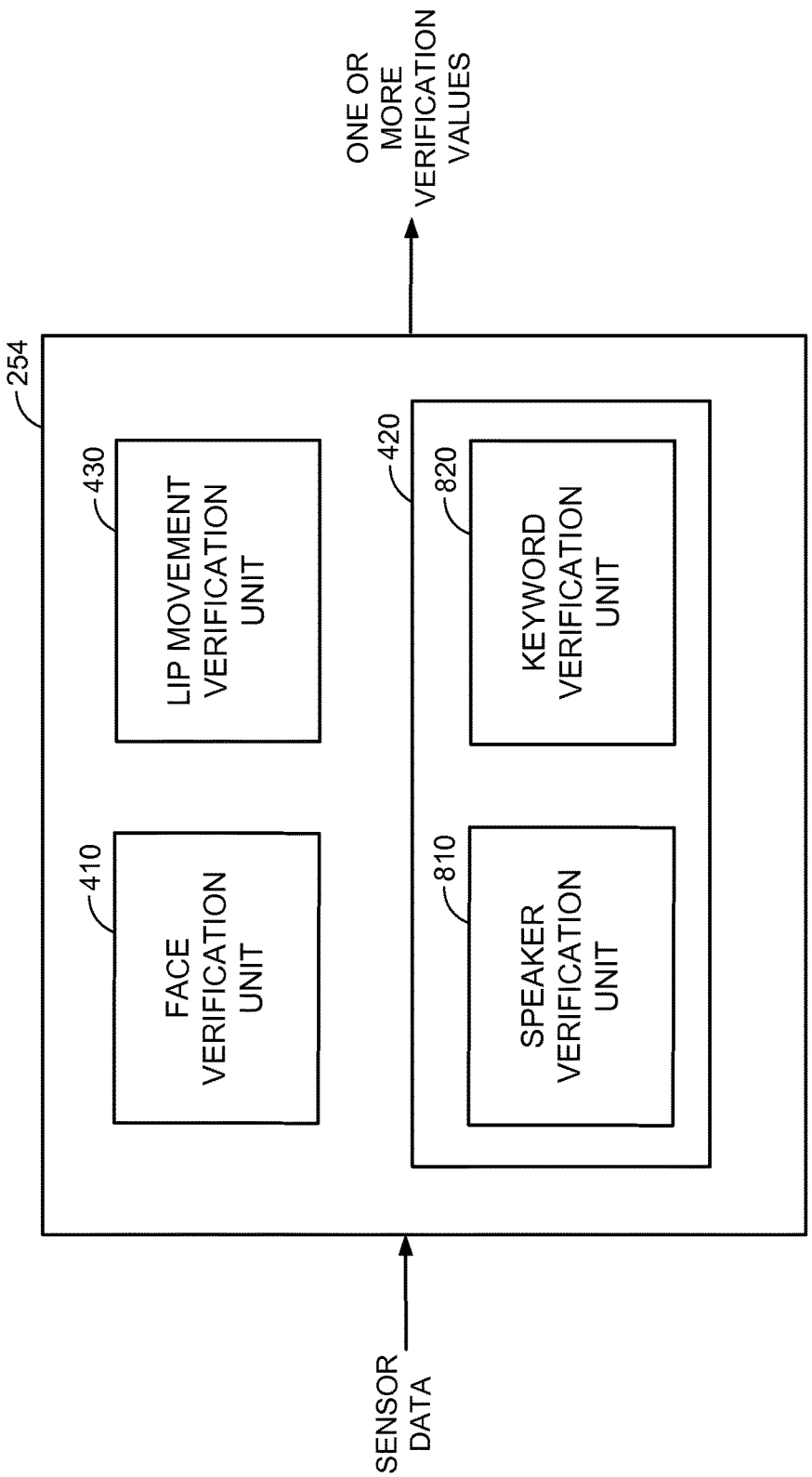
FIG. 8 is a block diagram of a verification engine configured to receive sensor data and calculate one or more verification values associated with the sensor data, according to one embodiment of the present disclosure.

FIG. 8 is a block diagram of the verification engine 254 configured to receive sensor data and calculate one or more verification values associated with the sensor data according to one embodiment of the present disclosure. The sensor data may be received from the sensor unit 210 or external device through the communication unit 240 via a communication network. As shown, the verification engine 254 may include the face verification unit 410, the voice verification unit 420, and the lip movement verification unit 430. The voice verification unit 420 may include a speaker verification unit 810 and a keyword verification unit 820. Although the verification engine 254 is illustrated as including the verification units 410, 420, and 430, it may also include the verification units 440, 450, 460, 470, and 480, as described above.

The verification engine 254 may receive, from the image sensor 130, one or more images including a face of a user as sensor data that may be provided to the face verification unit 410 and the lip movement verification unit 430. In one embodiment, each of the face verification unit 410 and the lip movement verification unit 430 may receive one or more images upon being selected and activated by the verification management unit 256. After receiving the images of the user, the face verification unit 410 may calculate a verification value for the user based on a degree of similarity between the user's face in the received images and a reference face of the user that may be stored in the storage unit 230. From the received images, the lip movement verification unit 430 may detect a lip movement of the user in the images and compare the detected lip movement to a predetermined lip movement in the command database from the storage unit 230 for calculating a verification value for the user. Each of the verification values calculated by the face verification unit 410 and the lip movement verification unit 430 may be provided to the verification management unit 256.

In one embodiment, upon being selected and activated by the verification management unit 256, the voice verification unit 420 may receive an input sound as sensor data from the sound sensor 140. The input sound may include a predetermined command, which may be spoken from a user to access the electronic device, and an environmental sound or noise. Upon receiving the input sound, the speaker verification unit 810 in the voice verification unit 420 may calculate a verification value indicative of an authorized user. The verification value may be a value or score indicative of a probability that a voice of a user, which may have spoken the predetermined command, corresponds to a voice of an authorized user. For example, the speaker verification unit 810 may calculate a verification value by extracting one or more features of the input sound and comparing the extracted features and reference features (e.g., a speaker model) indicative of an authorized user that may be stored in the storage unit 230. The verification value calculated by the speaker verification unit 810 may then be provided to the verification management unit 256.

Additionally or alternatively, the keyword verification unit 820 in the voice verification unit 420 may calculate a verification value indicative of a predetermined keyword based on the received input sound. The verification value calculated by the keyword verification unit 820 may be indicative of a probability (e.g., a degree of similarity) that the user's command in the input sound corresponds to a predetermined keyword in the command database from the storage unit 230. For example, the keyword verification unit 820 may determine a similarity between the command in the input sound and the predetermined keyword to calculate a verification value. The keyword verification unit 820 may provide the verification value associated with the predetermined keyword to the verification management unit 256.

According to some embodiments, the voice verification unit 420 may determine a verification value associated with the input sound based on the verification values calculated by the speaker verification unit 810 and the keyword verification unit 820. For example, the voice verification unit 420 may calculate a verification value for an input sound by averaging the verification values calculated by the speaker verification unit 810 and the keyword verification unit 820. The verification value as calculated may then be provided to the verification management unit 256.

Figure 9:
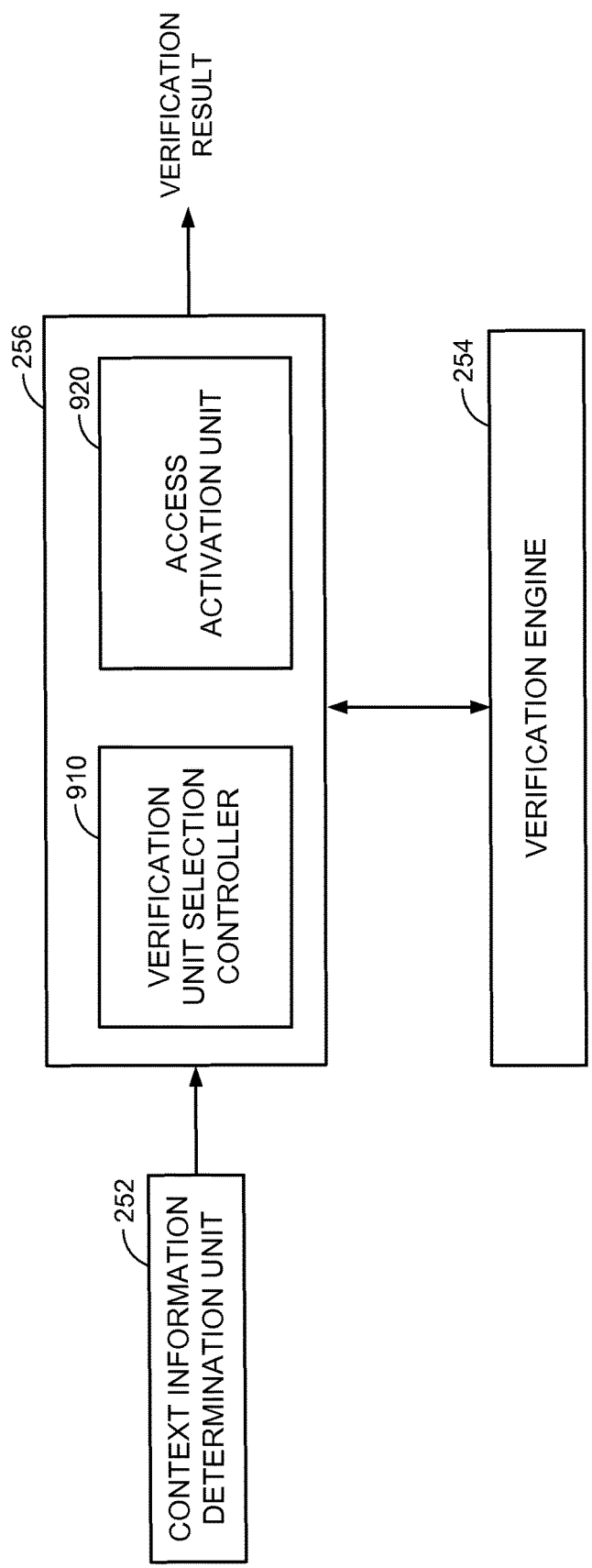
FIG. 9 is a block diagram of a verification management unit configured to determine whether to allow a user to access an electronic device based on one or more verification values and context information, according to one embodiment of the present disclosure.

FIG. 9 is a block diagram of the verification management unit 256 configured to determine whether to allow a user to access the electronic device 120 based on one or more verification values and context information, according to one embodiment of the present disclosure. As shown, the verification management unit 256 may include a verification unit selection controller 910 and an access activation unit 920. The verification management unit 256 may receive context information of the electronic device 120 from the context information determination unit 252. Upon receiving the context information, the verification unit selection controller 910 may select one or more verification units in the verification engine 254 based on the context information, and activate the selected verification units in the verification engine 254, as described above with reference to FIG. 7. In response, the selected verification units may calculate one or more verification values based on sensor data and provide the verification values to the verification management unit 256, as described above with reference to FIGS. 4 and 8.

Upon receiving one or more verification values calculated by the selected verification units, the access activation unit 920 in the verification management unit 256 may determine whether to authorize access to the electronic device 120 based on the verification values and the context information. In this process, the access activation unit 920 may determine one or more weights for the verification values based on the context information and calculate a weighted verification value for each of the verification values. According to some embodiments, the verification management unit 256 may receive one or more reliability values for sensor data as context information to determine a weight for each of the verification values. The reliability values may include at least one of reliability values for one or more image of a user, an input sound, or a motion of the electronic device 120. A weight may be assigned to a verification value calculated by a verification unit based on a reliability value for sensor data associated with the verification unit. For example, if a reliability value for a motion of the electronic device 120 is greater than a reliability value for an input sound, a weight assigned for a verification value calculated by the motion verification unit 470 may be greater than a weight assigned for a verification value calculated by the voice verification unit 420.

Upon determining one or more weights associated with the received verification values, the access activation unit 920 may determine a weighted verification value for each of the verification values. In one embodiment, the access activation unit 920 may calculate a weighted verification value for each of the verification values by multiplying the verification value and the associated weight. The access activation unit 920 may then sum the weighted verification values to calculate a weighted verification value for the received verification values. Based on the weighted verification value, the access activation unit 920 may output a verification result for authorizing access to the electronic device 120. For example, if the weighted verification value for the verification values is determined to be greater than or equal to a predetermined threshold verification value, the access activation unit 920 may activate or unlock the electronic device 120 to allow the user to access the electronic device 120.

In one embodiment, the access activation unit 920 may receive location context information and/or event context information including a security level from the context information determination unit 252. Based on the security level, the access activation unit 920 may adjust a predetermined threshold verification value that may be compared to a weighted verification values for verification values. For example, if a security level is high, a predetermined threshold verification value may be adjusted to be higher. On the other hand, if a security level is low, the access activation unit 920 may lower a predetermined threshold verification value.

Figure 10:
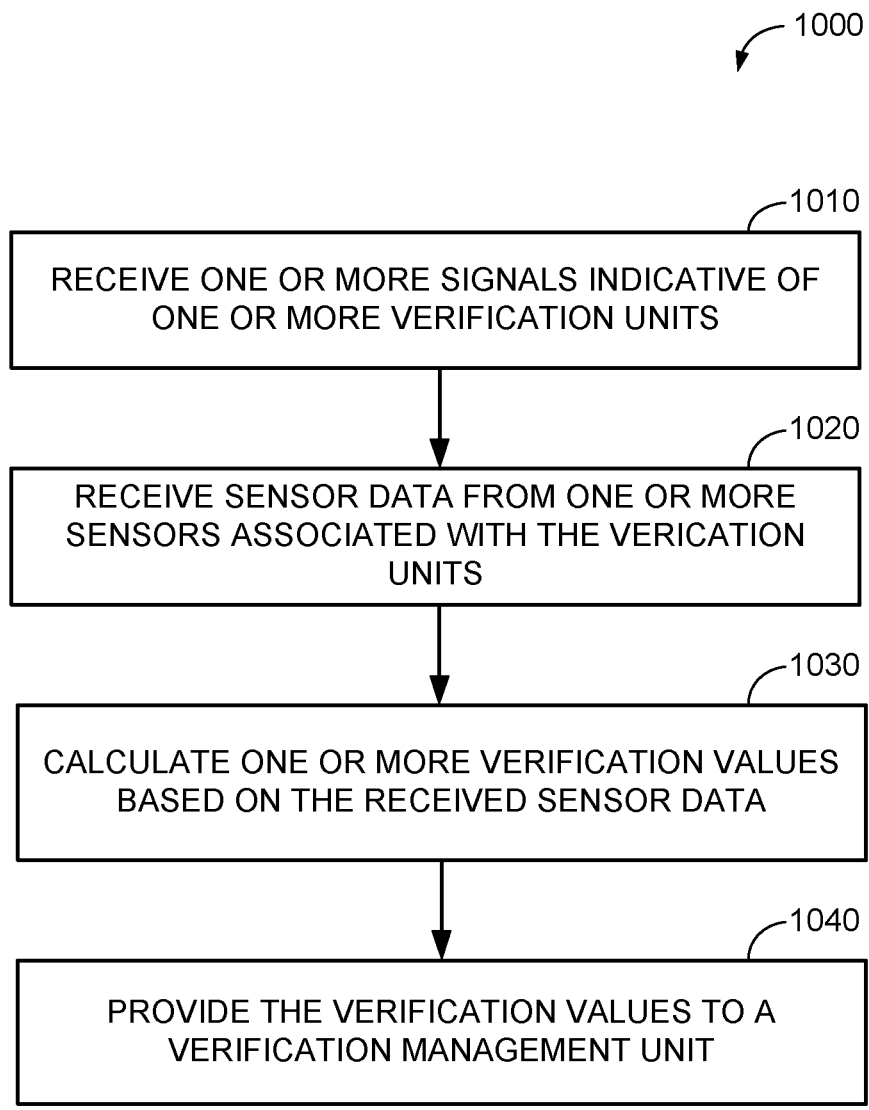
FIG. 10 is a flowchart of a method performed by a verification engine configured to calculate one or more verification values based on sensor data, according to one embodiment of the present disclosure.

FIG. 10 is a flowchart of a method 1000 performed by the verification engine 254 configured to calculate one or more verification values based on sensor data, according to one embodiment of the present disclosure. At 1010, the verification engine 254 may receive, from the verification management unit 256, one or more signals indicative of one or more verification units, which may be selected based on context information of the electronic device 120. Upon receiving the signals from the verification management unit 256, the verification engine 254 may activate the selected verification units to receive sensor data from one or more sensors associated with the selected verification units, at 1020.

At 1030, each of the selected verification units may calculate a verification value based on the sensor data associated with the verification unit. For example, the face verification unit 410 may receive an image including a user as sensor data from the image sensor 130 and calculate a verification value for the image. At 1040, the calculated verification values may then be provided to the verification management unit 256, which may verify whether the user is authorized to access the electronic device 120.

Figure 11:
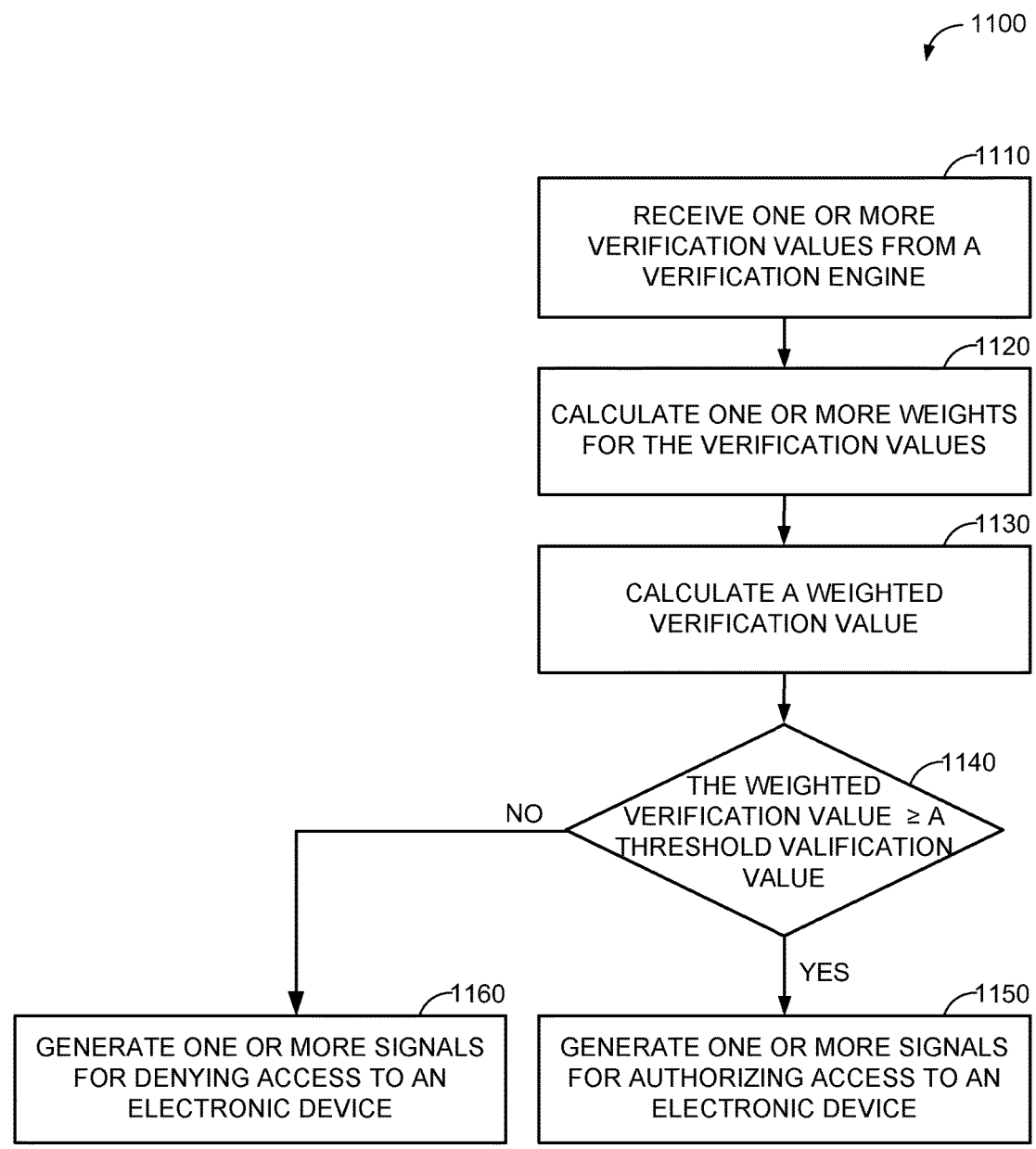
FIG. 11 is a flowchart of a method performed by a verification management unit configured to determine whether to allow access to an electronic device based on one or more verification values and context information, according to one embodiment of the present disclosure.

FIG. 11 is a flowchart of a method 1100 performed by the verification management unit 256 configured to determine whether to allow access to the electronic device 120 based on one or more verification values and context information, according to one embodiment of the present disclosure. Initially, the verification management unit 256 may receive the verification values from the verification engine 254, at 1110. In this case, the verification values may be calculated by one or more verification units, which may be selected and activated by the verification management unit 256.

At 1120, the verification management unit 256 may calculate one or more weights for the selected verification units. In one embodiment, a weight may be assigned to each of the verification units or the verification value associated with the verification unit. Based on the verification values and the weights, the verification management unit 256 may calculate a weighted verification value for the verification values, at 1130. For example, a weighted verification value for each of the verification values may be calculated by multiplying the verification value and the associated weight and a weighted verification value for the verification values may then be generated by summing the weighted verification values.

At 1140, the method 1100 may determine whether the weighted verification value for the verification values is greater than or equal to a predetermined threshold verification value. If it is determined that the weighted verification value is greater than or equal to a predetermined threshold verification value (i.e., YES at 1140), the method may proceed to 1150 that the verification management unit 256 may generate one or more signals for a user to authorize access to the electronic device 120. Otherwise (i.e., NO at 1140), the verification management unit 256 may generate one or more signals for a user to deny access to the electronic device 120.

Figure 12:
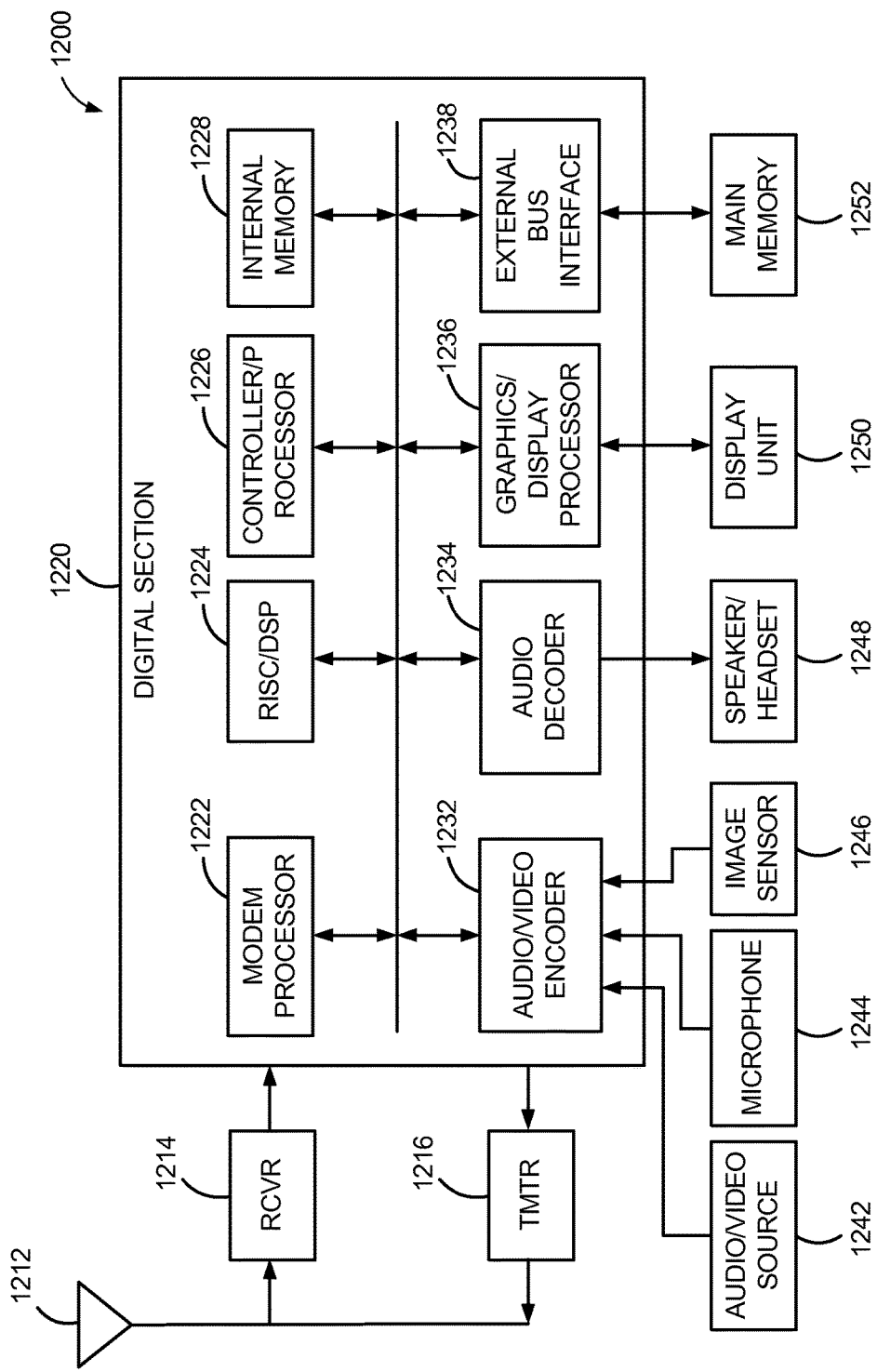
FIG. 12 is a block diagram of an exemplary electronic device in which the methods and apparatus for verifying a user to allow access to the electronic device may be implemented, according to one embodiment of the present disclosure.

FIG. 12 is a block diagram of an exemplary electronic device in which the methods and apparatus for verifying a user to allow access to the electronic device, according to one embodiment of the present disclosure. The configuration of the electronic device 1200 may be implemented in the electronic devices according to the above embodiments described with reference to FIGS. 1 to 11. The electronic device 1200 may be a cellular phone, a smartphone, a tablet computer, a laptop computer, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Term Evolution (LTE) system, LTE Advanced system, etc. Further, the electronic device 1200 may communicate directly with another mobile device, e.g., using Wi-Fi Direct or Bluetooth.

The electronic device 1200 is capable of providing bidirectional communication via a receive path and a transmit path. On the receive path, signals transmitted by base stations are received by an antenna 1212 and are provided to a receiver (RCVR) 1214. The receiver 1214 conditions and digitizes the received signal and provides samples such as the conditioned and digitized digital signal to a digital section for further processing. On the transmit path, a transmitter (TMTR) 1216 receives data to be transmitted from a digital section 1210, processes and conditions the data, and generates a modulated signal, which is transmitted via the antenna 1212 to the base stations. The receiver 1214 and the transmitter 1216 may be part of a transceiver that may support CDMA, GSM, LTE, LTE Advanced, etc.

The digital section 1210 includes various processing, interface, and memory units such as, for example, a modem processor 1222, a reduced instruction set computer/digital signal processor (RISC/DSP) 1224, a controller/processor 1226, an internal memory 1228, a generalized audio/video encoder 1232, a generalized audio decoder 1234, a graphics/display processor 1236, and an external bus interface (EBI) 1238. The modem processor 1222 may perform processing for data transmission and reception, e.g., encoding, modulation, demodulation, and decoding. The RISC/DSP 1224 may perform general and specialized processing for the electronic device 1200. The controller/processor 1226 may perform the operation of various processing and interface units within the digital section 1210. The internal memory 1228 may store data and/or instructions for various units within the digital section 1210.

The generalized audio/video encoder 1232 may perform encoding for input signals from an audio/video source 1242, a microphone 1244, an image sensor 1246, etc. The generalized audio decoder 1234 may perform decoding for coded audio data and may provide output signals to a speaker/headset 1248. The graphics/display processor 1236 may perform processing for graphics, videos, images, and texts, which may be presented to a display unit 1250. The EBI 1238 may facilitate transfer of data between the digital section 1210 and a main memory 1252.

The digital section 1210 may be implemented with one or more processors, DSPs, microprocessors, RISCs, etc. The digital section 1210 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

ASPECTS OF THE PRESENT DISCLOSURE

Hereinafter, some aspects of the present disclosure will be additionally stated.

Example 1

According to an aspect of the present disclosure, there is provided a method, performed by an electronic device, for verifying a user to allow access to the electronic device, the method including receiving sensor data from a plurality of sensors, wherein the plurality of sensors includes at least an image sensor and a sound sensor; determining context information of the electronic device based on the sensor data; selecting at least one verification unit from a plurality of verification units based on the context information, wherein each of the plurality of verification units is capable of verifying whether the user is authorized to access the electronic device; calculating, by the at least one selected verification unit, at least one verification value based on the sensor data from at least one of the image sensor or the sound sensor, wherein each of the at least one verification value is indicative of at least one of an authorized user or a predetermined access command; and determining whether to allow the user to access the electronic device based on the at least one verification value and the context information.

Example 2

In the method of Example 1, receiving the sensor data from the plurality of sensors includes: receiving, from the image sensor, first sensor data, wherein the first sensor data include at least one image indicative of the user; and receiving, from the sound sensor, second sensor data, wherein the second sensor data include an input sound indicative of at least one of a sound from the user or an environmental sound.

Example 3

In the method of Example 1 or 2, determining the context information of the electronic device includes calculating at least one reliability value indicative of data quality of at least one of the first sensor data or the second sensor data.

Example 4

In the method of any one of Examples 1 to 3, selecting the at least one verification unit from the plurality of verification units includes selecting the at least one verification unit from the plurality of verification units based on the at least one reliability value.

Example 5

In the method of any one of Examples 1 to 4, monitoring a power status of the electronic device is further included, and determining the context information of the electronic device includes determining the context information based at least on the power status of the electronic device.

Example 6

In the method of any one of Examples 1 to 5, determining the context information of the electronic device includes: detecting an event associated with a security level; and determining the context information based at least on the security level associated with the event.

Example 7

In the method of any one of Examples 1 to 6, the plurality of sensors includes at least one of an accelerometer or a gyroscope, and the sensor data from the at least one of the accelerometer or the gyroscope are indicative of a motion of the electronic device.

Example 8

In the method of any one of Examples 1 to 7, the plurality of sensors includes a location sensor, and the sensor data from the location sensor are indicative of a location of the electronic device.

Example 9

In the method of any one of Examples 1 to 8, determining whether to allow the user to access the electronic device includes: assigning at least one weight to the at least one selected verification unit based on the context information; and determining whether to allow the user to access the electronic device based on the at least one verification value and the at least one weight.

Example 10

In the method of any one of Examples 1 to 9, the plurality of verification units includes at least two among a face verification unit, a lip movement verification unit, a voice verification unit, a passcode verification unit, a fingerprint verification unit, and a retina verification unit.

Example 11

In the method of any one of Examples 1 to 10, the predetermined access command includes at least one of a keyword, a pattern of motion, a lip movement, or a facial expression.

Example 12

According to another aspect of the present disclosure, there is provided an electronic device for verifying a user to allow access to the electronic device, the electronic device including a processor configured to receive sensor data from a plurality of sensors, wherein the plurality of sensors includes at least an image sensor and a sound sensor, the processor including: a context information determination unit configured to determine context information of the electronic device based on the sensor data; a verification management unit configured to select at least one verification unit from a plurality of verification units based on the context information, wherein each of the plurality of verification units is capable of verifying whether the user is authorized to access the electronic device; and a verification engine including the plurality of verification units, wherein the at least one selected verification unit is configured to calculate at least one verification value based on the sensor data from at least one of the image sensor or the sound sensor, and each of the at least one verification value is indicative of at least one of an authorized user or a predetermined access command, wherein the verification management unit is configured to determine whether to allow the user to access the electronic device based on the at least one verification value and the context information.

Example 13

In the electronic device of Example 12, the processor is configured to: receive, from the image sensor, first sensor data, wherein the first sensor data include at least one image indicative of the user; and receive, from the sound sensor, second sensor data, wherein the second sensor data include an input sound indicative of at least one of a sound from the user or an environmental sound.

Example 14

In the electronic device of Example 12 or 13, the context information determination unit is configured to calculate at least one reliability value indicative of data quality of at least one of the first sensor data or the second sensor data.

Example 15

In the electronic device of any one of Examples 12 to 14, the verification management unit is configured to select the at least one verification unit from the plurality of verification units based on the at least one reliability value.

Example 16

In the electronic device of any one of Examples 12 to 15, a power sensor configured to monitor a power status of the electronic device is further included, and the context information determination unit is configured to determine the context information based at least on the power status of the electronic device.

Example 17

In the electronic device of any one of Examples 12 to 16, the context information determination unit is configured to: detect an event associated with a security level; and determine the context information based at least on the security level associated with the event.

Example 18

In the electronic device of any one of Examples 12 to 17, the plurality of sensors includes at least one of an accelerometer or a gyroscope, and the sensor data from the at least one of the accelerometer or the gyroscope are indicative of a motion of the electronic device.

Example 19

In the electronic device of any one of Examples 12 to 18, the plurality of sensors includes a location sensor, and the sensor data from the location sensor are indicative of a location of the electronic device.

Example 20

In the electronic device of any one of Examples 12 to 19, the verification management unit is configured to: assign at least one weight to the at least one selected verification unit based on the context information; and determine whether to allow the user to access the electronic device based on the at least one verification value and the at least one weight.

Example 21

In the electronic device of any one of Examples 12 to 20, the plurality of verification units includes at least two among a face verification unit, a lip movement verification unit, a voice verification unit, a passcode verification unit, a fingerprint verification unit, and a retina verification unit.

Example 22

In the electronic device of any one of Examples 12 to 21, the predetermined access command includes at least one of a keyword, a pattern of motion, a lip movement, or a facial expression.

Example 23

According to still another aspect of the present disclosure, there is provided a non-transitory computer-readable storage medium including instructions for verifying, by an electronic device, a user to allow access to the electronic device, the instructions causing a processor of the electronic device to perform the operations of: receiving sensor data from a plurality of sensors, wherein the plurality of sensors includes at least an image sensor and a sound sensor; determining context information of the electronic device based on the sensor data; selecting at least one verification unit from a plurality of verification units based on the context information, wherein each of the plurality of verification units is capable of verifying whether the user is authorized to access the electronic device; calculating, by the at least one selected verification unit, at least one verification value based on the sensor data from at least one of the image sensor or the sound sensor, wherein each of the at least one verification value is indicative of at least one of an authorized user or a predetermined access command; and determining whether to allow the user to access the electronic device based on the at least one verification value and the context information.

Example 24

According to yet another aspect of the present disclosure, there is provided an electronic device for verifying a user to allow access to the electronic device, including: means for receiving sensor data from a plurality of sensors, wherein the plurality of sensors includes at least an image sensor and a sound sensor; means for determining context information of the electronic device based on the sensor data; means for selecting at least one verification unit from a plurality of verification units based on the context information, wherein each of the plurality of verification units is capable of verifying whether the user is authorized to access the electronic device; means for calculating at least one verification value of the at least one selected verification unit based on the sensor data from at least one of the image sensor or the sound sensor, wherein each of the at least one verification value is indicative of at least one of an authorized user or a predetermined access command; and means for determining whether to allow the user to access the electronic device based on the at least one verification value and the context information.

Example 25

In the electronic device of Example 24, the means for receiving the sensor data from the plurality of sensors includes: means for receiving, from the image sensor, first sensor data, wherein the first sensor data include at least one image indicative of the user; and means for receiving, from the sound sensor, second sensor data, wherein the second sensor data include an input sound indicative of at least one of a sound from the user or an environmental sound.

Example 26

In the electronic device of Example 24 or 25, the means for determining the context information of the electronic device includes means for calculating at least one reliability value indicative of data quality of at least one of the first sensor data or the second sensor data.

Example 27

In the electronic device of any one of Examples 24 to 26, the means for selecting the at least one verification unit from the plurality of verification units includes means for selecting the at least one verification unit from the plurality of verification units based on the at least one reliability value.

Example 28

In the electronic device of any one of Examples 24 to 27, means for monitoring a power status of the electronic device is further included, and the means for determining the context information of the electronic device includes means for determining the context information based at least on the power status of the electronic device.

Example 29

In the electronic device of any one of Examples 24 to 28, the means for determining the context information of the electronic device includes: means for detecting an event associated with a security level; and means for determining the context information based at least on the security level associated with the event.

Example 30

In the electronic device of any one of Examples 24 to 29, the means for determining whether to allow the user to access the electronic device includes: means for determining at least one weight for the at least one selected verification unit based on the context information; and means for determining whether to allow the user to access the electronic device based on the at least one verification value and the at least one weight.

What is claimed:

1. A method, performed by an electronic device, for determining whether to allow a user to access the electronic device, the method comprising:
   receiving sensor data from a plurality of sensors, wherein the plurality of sensors includes at least an image sensor and a sound sensor;
   determining context information of the electronic device based on the sensor data wherein the context information includes at least one reliability value indicative of a quality of the sensor data;
   selecting at least one verification unit from a plurality of verification units based on the at least one reliability value, wherein each of the plurality of verification units is configured to determine whether the user is authorized to access the electronic device;
   assigning at least one weight to the at least one selected verification unit based on the context information;
   calculating, by the at least one selected verification unit, at least one verification value based on the sensor data from at least one of the image sensor or the sound sensor, wherein the at least one verification value is indicative of an authorized user or an access command;
   calculating a weighted verification value by multiplying the at least one verification value by the at least one weight; and
   determining whether to allow the user to access the electronic device based on a comparison of the weighted verification value with a threshold verification value.

2. The method of claim 1, wherein receiving the sensor data from the plurality of sensors comprises:
   receiving, from the image sensor, first sensor data, wherein the first sensor data includes data representative of at least one image indicative of the user; and
   receiving, from the sound sensor, second sensor data, wherein the second sensor data includes data related to an input sound indicative of at least one of a sound from the user or an environmental sound.

3. The method of claim 1, wherein determining the context information is based on at least one of a sharpness value, a brightness value, a contrast value, or a saturation value.

4. The method of claim 1, wherein determining the context information comprises comparing image parameters to at least one parameter of a reference image.

5. The method of claim 1, further comprising monitoring a power status of the electronic device, wherein determining the context information of the electronic device comprises determining the context information based at least on the power status of the electronic device.

6. The method of claim 1, wherein determining the context information of the electronic device comprises:
   detecting an event associated with a security level; and
   determining the context information based at least on the security level associated with the event.

7. The method of claim 1, wherein the plurality of sensors includes at least one of an accelerometer or a gyroscope, and the sensor data from at least one of the accelerometer or the gyroscope is indicative of a motion of the electronic device.

8. The method of claim 1, wherein the plurality of sensors includes a location sensor, and the sensor data from the location sensor is indicative of a location of the electronic device.

9. The method of claim 1, wherein the threshold verification value is configured to be adjusted based on the context information.

10. The method of claim 1, wherein the plurality of verification units includes at least two among a face verification unit, a lip movement verification unit, a voice verification unit, a passcode verification unit, a fingerprint verification unit, and a retina verification unit.

11. The method of claim 1, wherein the access command includes at least one of a keyword, a pattern of motion, a lip movement, or a facial expression.

12. An electronic device for determining whether to allow a user to access the electronic device, comprising:
   a plurality of sensors including at least an image sensor and a sound sensor; and
   processing circuitry comprising at least one processor configured to receive sensor data from the plurality of sensors, the at least one processor comprising:
      context information determination logic configured to determine context information of the electronic device based on the sensor data, wherein the context information includes at least one reliability value indicative of a quality of the sensor data;
      verification management logic configured to select at least one verification logic unit from a plurality of verification logic units based on the at least one reliability value, wherein each of the plurality of verification logic units is configured to determine whether the user is authorized to access the electronic device, wherein the verification management logic is configured to assign at least one weight to the at least one selected verification logic unit based on the context information; and
      a verification engine including the plurality of verification logic units, wherein the at least one selected verification logic unit is configured to calculate at least one verification value based on the sensor data from at least one of the image sensor or the sound sensor, and the at least one verification value is indicative of an authorized user or an access command,
      wherein the verification management logic is configured to calculate a weighted verification value by multiplying the at least one verification value by the at least one weight and to determine whether to allow the user to access the electronic device based on a comparison of the weighted verification value with a threshold verification value.

13. The electronic device of claim 12, wherein the at least one processor is configured to:
   receive, from the image sensor, first sensor data, wherein the first sensor data includes data representative of at least one image indicative of the user; and
   receive, from the sound sensor, second sensor data, wherein the second sensor data includes data related to an input sound indicative of at least one of a sound from the user or an environmental sound.

14. The electronic device of claim 12, wherein the at least one reliability value is determined based on at least one of a sharpness value, a brightness value, a contrast value, or a saturation value.

15. The electronic device of claim 12, wherein determining the context information comprises comparing image parameters to at least one parameter of a reference image.

16. The electronic device of claim 12, further comprising a power sensor configured to monitor a power status of the electronic device, wherein the context information determination logic is configured to determine the context information based at least on the power status of the electronic device.

17. The electronic device of claim 12, wherein the context information determination logic is configured to:
  detect an event associated with a security level; and
  determine the context information based at least on the security level associated with the event.

18. The electronic device of claim 12, wherein the plurality of sensors includes at least one of an accelerometer or a gyroscope, and the sensor data from the at least one of the accelerometer or the gyroscope are indicative of a motion of the electronic device.

19. The electronic device of claim 12, wherein the plurality of sensors includes a location sensor, and the sensor data from the location sensor are indicative of a location of the electronic device.

20. The electronic device of claim 12, wherein the threshold verification value is configured to be adjusted based on the context information.

21. The electronic device of claim 12, wherein the plurality of verification logic units includes at least two among a face verification unit, a lip movement verification unit, a voice verification unit, a passcode verification unit, a fingerprint verification unit, and a retina verification unit.

22. The electronic device of claim 12, wherein the access command includes at least one of a keyword, a pattern of motion, a lip movement, or a facial expression.

23. A non-transitory computer-readable storage medium comprising instructions for determining whether to allow, by an electronic device, a user to access the electronic device, the instructions causing a processor of the electronic device to perform the operations of:
  receiving sensor data from a plurality of sensors, wherein the plurality of sensors includes at least an image sensor and a sound sensor;
  determining context information of the electronic device based on the sensor data, wherein the context information includes at least one reliability value indicative of a quality of the sensor data;
  selecting at least one verification unit from a plurality of verification units based on the at least one reliability value, wherein each of the plurality of verification units is configured to determine whether the user is authorized to access the electronic device;
  assigning at least one weight to the at least one selected verification unit based on the context information;
  calculating, by the at least one selected verification unit, at least one verification value based on the sensor data from at least one of the image sensor or the sound sensor, wherein the at least one verification value is indicative of an authorized user or an access command;
  calculating a weighted verification value by multiplying the at least one verification value by the at least one weight; and
  determining whether to allow the user to access the electronic device based on a comparison of the weighted verification value with a threshold verification value.

24. An electronic device for determining whether to allow a user to access the electronic device, comprising:
  means for sensing, wherein the means for sensing includes at least an image sensor and a sound sensor;
  means for processing sensor data received from the means for sensing, wherein the means for processing is configured to;
    determine context information of the electronic device based on the sensor data, wherein the context information includes at least one reliability value indicative of a quality of the sensor data;
    select at least one verification unit from a plurality of verification units based on the at least one reliability value, wherein each of the plurality of verification units is configured to determine whether the user is authorized to access the electronic device;
    assign at least one weight to the at least one selected verification unit based on the context information;
    calculate at least one verification value of the at least one selected verification unit based on the sensor data from at least one of the image sensor or the sound sensor, wherein the at least one verification value is indicative of an authorized user or an access command;
    calculate a weighted verification value by multiplying the at least one verification value by the at least one weight; and
    determine whether to allow the user to access the electronic device based on a comparison of the weighted verification value with a threshold verification value.

25. The electronic device of claim 24, wherein the means for processing is further configured to:
  receive, from the image sensor, first sensor data, wherein the first sensor data includes data representative of at least one image indicative of the user; and
  receive, from the sound sensor, second sensor data, wherein the second sensor data includes data related to an input sound indicative of at least one of a sound from the user or an environmental sound.

26. The electronic device of claim 24, wherein determining the context information is based on at least one of a sharpness value, a brightness value, a contrast value, or a saturation value.

27. The electronic device of claim 24, wherein determining the context information comprises means for comparing image parameters to at least one parameter of a reference image.

28. The electronic device of claim 24, wherein the means for processing is further configured to monitor a power status of the electronic device, and wherein determining the context information of the electronic device comprises determining the context information based at least on the power status of the electronic device.

29. The electronic device of claim 24, wherein determining the context information of the electronic device comprises:
  detecting an event associated with a security level; and
  determining the context information based at least on the security level associated with the event.

30. The electronic device of claim 24, wherein the threshold verification value is configured to be adjusted based on the context information.

* * * * *